United States Patent
Geiser et al.

(12) 
(10) Patent No.: US 6,346,124 B1
(45) Date of Patent: Feb. 12, 2002

(54) AUTONOMOUS BOUNDARY DETECTION SYSTEM FOR ECHOCARDIOGRAPHIC IMAGES

(75) Inventors: Edward A. Geiser; David C. Wilson, both of Gainesville, FL (US)

(73) Assignee: University of Florida, Gainesville, FL (US)

( * ) Notice: Subject to any disclaimer, the term of this patent is extended or adjusted under 35 U.S.C. 154(b) by 0 days.

(21) Appl. No.: 09/590,799

(22) Filed: Jun. 9, 2000

Related U.S. Application Data

(63) Continuation-in-part of application No. 09/139,688, filed on Aug. 25, 1998, now abandoned.

(51) Int. Cl.[7] ............................................. A61B 8/00

(52) U.S. Cl. ..................................................... 660/450

(58) Field of Search ............................... 600/425, 437, 600/443, 450

(56) References Cited

U.S. PATENT DOCUMENTS

| | | |
|---|---|---|
| 4,101,961 A | 7/1978 | Reiber |
| 4,720,870 A | 1/1988 | Billiotte et al. |
| 4,907,156 A | 3/1990 | Doi et al. |
| 4,936,311 A | 6/1990 | Oe |
| 5,056,024 A | 10/1991 | Stuyts |
| 5,107,838 A | 4/1992 | Yamaguchi |
| 5,257,624 A | 11/1993 | Fraser et al. |
| 5,322,067 A | 6/1994 | Prater et al. |
| 5,360,006 A | 11/1994 | Geiser et al. |
| 5,435,310 A * | 7/1995 | Sheehan et al. ............ 600/443 |
| 5,601,084 A * | 2/1997 | Sheehan et al. ............ 600/450 |
| 5,734,739 A | 3/1998 | Sheehan et al. |
| 5,797,396 A | 8/1998 | Geiser et al. |

FOREIGN PATENT DOCUMENTS

| | | |
|---|---|---|
| FR | 2583547 | 12/1986 |
| WO | WO 91/19457 | 12/1991 |
| WO | WO 94/05288 | 3/1994 |
| WO | WO 96/41312 | 12/1996 |

OTHER PUBLICATIONS

Adam et al., "Semiautomated border tracking of cine echocardiogram ventricular images" *IEEE Transactions on Medical Imaging*, MI–6(3), 1987.

Blokland et al., "Delineating elliptical objects with an application to cardiac scintigrams," *IEEE Transactions on Medical Imaging*, MI–6(1):57–66, 1987.

(List continued on next page.)

*Primary Examiner*—William E. Kamm
(74) *Attorney, Agent, or Firm*—Miles & Stockbridge; Dennis P. Clarke

(57) ABSTRACT

A method for generating a synthesis echocardiographic image comprises first obtaining, for a plurality of pathologically similar reference hearts, a reference echocardiographic image of each reference heart at end-systole and at end-diastole. Next, the coupled epicardial and endocardial borders are identified in each echocardiographic image. An epicardial/endocardial border pair is then modeled from the identified borders. The method then locates a plurality of predetermined features in the reference echocardiographic images. The predetermined features are then located in the subject echocardiographic image from the location of the predetermined features in the reference echocardiographic images. The modeled epicardial/endocardial border pair is then mapped onto the subject echocardiographic image relative to the location of the predetermined features in the subject echocardiographic image. The apparatus generally comprises an echocardiographic machine for obtaining the echocardiographic images that are then processed by a computing system. Other features include a computing system programmed to perform the autonomous portions of the method and a program storage medium encoded with the instructions that perform the autonomous portions of the method when executed by a computer.

20 Claims, 11 Drawing Sheets

OTHER PUBLICATIONS

Bosch et al., "Automated endocardial contour detection in short–axis 2–D echocardiograms: methodology and assessment of variability," In: Proc. 15$^{th}$ Conf. comput. In Cardiol., 137–140, 1988.

Bosch et al., "Evaluation of semiautomatic contour detection approach in sequences of short–axis two–dimensional echocardiographic images," J.Am. Soc. Echocardiogr., 8:810–821, 1995.

Chalana et al., "A multiple active contour model for cardiac boundary detection on echocardiographic sequences," IEEE Trans. Med. Imag., 15:290–98, 1996.

Christiansen et al., "Physical and biochemical characterization of Albunex®, a new ultra–sound contrast agent consisting of air–filled albumin microspheres suspended in a solution of human albumin,", Biotechnol. Appl. Biochem., 19:307–20, 1994.

Chu et al., "Detecting left ventricular endocardial and epicardal boundaries by digital two dimensional echocardiography," IEEE Transactions on Medical Imaging, 7(2):81–90, 1988.

Conetta et al., "Reproducibility of left ventricular area and volume measurements using a computer endocardial edge detection algorithm in normal subjects, " American Journal Cardiology, 56:947–952, 1985.

Detmer et al., "Matched filter identification of left–ventricular endocardial borders in transesophageal echocardiograms," IEEE Transactions on Medical Imaging, 9(4):396–403,1990.

Dias and Leitao, "Wall position and thickness estimation from sequences of echocardiographic images," IEEE Trans. Med. Imag., 15:25–38, 1996.

Feigenbaum, "the echocardiographic examination," In: Echocardiography, 5$^{th}$ Edition, Lea & Febiger, Philadelphia, pp. 68–72, 77–78, 1995.

Friedland et al., "Automatic ventricular cavity boundary detection from sequential ultrasound images using simulated annealing," IEEE Transaction on Medical Imaging, 8(4):344–353, 1989.

Gasull et al. "Automatic left ventricular contour extraction for volume calculation from echocardiographic images," Ultrasonics International 1989 Conferences Proceedings, pp. 1173–1178, 1989.

Geiser et al., "Autonomous epicardial and endocardial boundary detection in echocardiographic short–axis images," J. Am. Soc. Echocardiography, 11(4):338–348, 1998.

Geiser, et al., "A second–generation computer–based edge detection alogrithm for short–axis, two–dimensional echocardiographic images; Accuracy and Improvement in Interobserver Variability," J. Am. Soc. Echocardiogr., 3(2):79–90, 1990.

Geiser et al., "Applications of cross–correlation techniques to the quantitation of wall motion in short–axis two–dimensional echocardiographic images," J. Am. Soc. Echocardiogr., 3(4):266–275, 1990.

Geiser et al., "A method for evaluation of enhancement operations in two–dimensional echocardiographic images," J. Am. Soc. Echo., 4:235–246, 1991.

Geiser et al., "Clinical validation of an edge detection algorithm for two dimensional echocardiographic short–axis images," J. Am. Soc. Echocardiogr., 1(6):410–421, 1988.

Geiser et al., "Evidence for a relation between inspired gas mixture and the left ventricular contras achieved with Albunex® in a canine model," Clin. Cardiol., 19:289–295, 1996.

Geiser,"Application of automatic edge detection and image enhancement techniques to two dimensional echocardiography and coronary disease," In: Echocardiography in Coronary Artery Disease, Kerber, Ed., Future Publishing Co., Inc., Mount Kisco, New York, Chapter 2, pp. 483–508, 1988.

Geny et al., "Safety and efficacy of new transpulmonary echo contrast agent in echocardiographic studies in patients," J. Am. Col. Cardiol., 22(4):1193–1198, 1993.

Han et al., Knowledge–based image analysis for automated boundary extraction of transesophageal echocardiographic left–ventricular images, IEEE Trans. Med. Imag., 10:602–610, 1991.

Henry et al., "Parasternal short axis view: left ventricle," Report of the American Society of Echocardiography Committee on nomenclature and Standards, Nov. 1982.

Hunter et al., "Fully automatic left ventricular boundary extraction in echocardigraphic images," IEEE Computers Cardiology, pp.741–744, 1995.

Kaneko et al., "Straignt–line approximation for the boundary of the left ventricular chamber from a cardiac cineangiogram," IEEE Transactions on Biomedical Engineering, BME–20(6):413–416, 1972.

Karras et al., "Automatic identification of papillary muscles in left–ventricular short–axis echocardiographic images," IEEE Transactions on Biomedical Engineering, 43(5):460–470, 1996.

Kaul, "Myocardial contrast echocardiography in coronary artery disease; potential applications using venous injections of contrast," Am. J. Cardiol., 61D–68D, 1995.

McEachen et al., "Shape–based tracking of naturally occurring annuli in image sequences," Computer Vision and Pattern Recognition '93, New York, New York, 1993.

Melton et al., "Rational–gain–compensation attenuation in ultrasonic cardiac imaging," Ultrasonics Symposium, pp. 607–611, 1981.

Meyer et al., "Estimation of ultransonic attenuation and mean back–scatterer size via digital signal processing," Ultrasonic Imaging, 6:13–23, 1984.

Monaghan et al., "Digital radio frequency echocardiography in the detection of myocardial contrast following intravenous administration of Albunex®," Eur. Heart J., 14(9):1200–1209, 1993.

Nitzan et al., "Comparison of geometric and densitometric techniques for the measurement of left ventricular volume changes," Proceedings of the Conference on Computers in Cardiology, Sep. 19–22, 1989; Jerusalem, Israel; IEEE Computer Society Press, Washington (U.S.), pp. 389–391, 1989.

Parker et al., "Application of point distribution Models to the automated analysis of echocardiograms," IEEE Computers Cardiology, pp. 25–28, 1994.

Perez et al., "On–line assessment of ventricular function by automatic boundary detection and ultrasound imaging," J. Am. Coll. Cardiol., 19:313–320, 1992.

Prasad and Srinivasan, "An image processing method for cardiac motion analysis," IEEE Trans. Biomed. Eng., BME–34(3):244–247, 1987.

Pratt, In; Digital Image Processing, John Wiley & Sons, New York, p. 566, 1978.

Rosenfeld and Kak, "Mathematical preliminaries," In: *Digital Pictures Processing*, Second Edition, vol. 1, Academic Press, New York, Chapter 2, pp. 10–13, 1982.

Rosenfeld and Kak, "Matching, " In: *Digital Picture Processing, Second Edition*, vol. 2, Academic Press, New York, Chapter 9, pp. 10–11, 36–46, 1982.

Stewart, In: Clinical Anatomy and Physiology for the Frustrated Health Professional, MedMaster. Inc., Miami, pp. 5, 113–120, 1986.

Torres et al., "A new algorithm for automatic border detection of two–dimensional echocardiographic images. Time varying image processing and moving object recognition," *Elsevier Science Publishing*, B.V., pp. 181–188, 1990.

Uchiyama et al., Comparison of manual and computer–assisted automatic measurement of wall thickness of the left ventricle in two–dimensional echocardiography, *Jap. Cir, J.*, 58:49–56, 1994.

van der Geest et al., "Automated detection of left ventricular epi– and endocardial contours in short–axis MR images," *IEEE Computers in Cardiology*, pp. 33–36, 1994.

Vandenberg et al., "Estimation of left ventricular cavity area with an on–line, Semiautomated echocardiographic edge detection system," *Circulation*, 86:159–166, 1992.

Weyman, In: *Principles and Practice of Echocardiography*, Second Edition, Lea & Febiger, Philadelphia, pp. 109–110, 1994.

Wible et al., "Inhaled gases affect the ultrasound contrast produced by albunex® in anesthetized dogs," *J. Am. Soc. Echocardiogr.*, 9:442–451, 1996.

Wible et al., "Improving the sonographic contrast produced by Albunex® during the inhalation of gases other than air," *Acad. Radiol.*, 3 Suppl. 2:S317–S319, 1996.

Wilson, et al., "Automatic center point determination in two–dimensional short–axis echocardiographic images," *Pattern Recognition*, 25(9):893–900. 1992.

Wilson, et al., "Feature extraction in two–dimensional short–axis echocardiographic images," *Journal of Mathematical Imaging and Vision*, 3:285–298, 1983.

Wilson et al., In: "The use of matched filters for extraction of left ventricular features in 2–dimensional short–axis echocardiographic images," *Mathematical Methods in Medical Imaging*, SPIE, 1768:37–49, 1992.

Wilson et al., "An automatic algorithm for analysis of 2–D echocardiographic short–axis images: a brief overview," *IEEE Transac. Biomed. Eng.*, 222–231, 1996.

Zhange and Geiser, "An e.ffective algorithm for extracting serial endocardial borders from two–dimensional echocardiograms," *IEEE Trans, Biomed. Eng.*, BME–31(6):441–447, 1984.

Geiser, "Edge detection and wall motion analysis," In: *Echocardiography: An International Review*, Chambers and Monaghan, Eds., Oxford: Oxford University Press, pp. 71–82, 1993.

Routh et al., "The role of quantification in ultrasound," *Medicamundi*, 43(3):11–16, 1999.

* cited by examiner

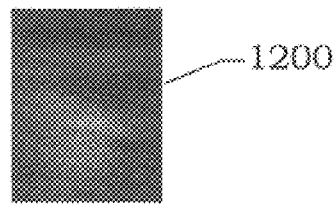
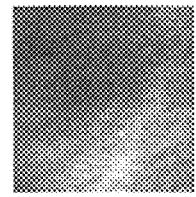
FIG. 12A  FIG. 12B
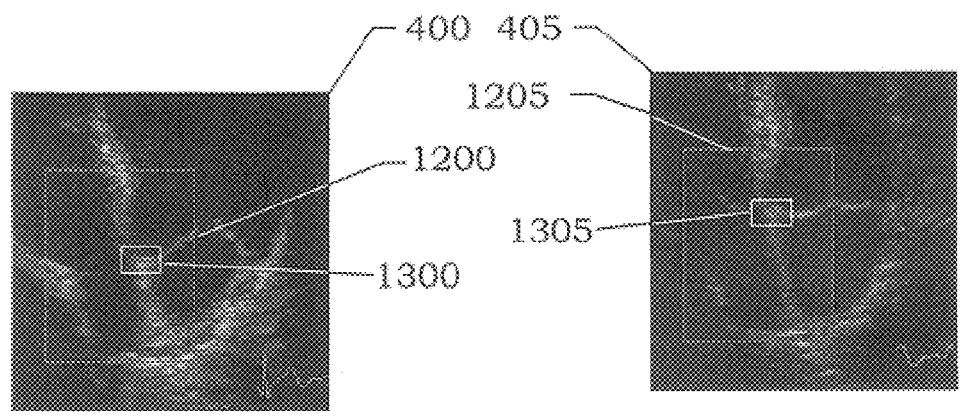
FIG. 13A  FIG. 13B
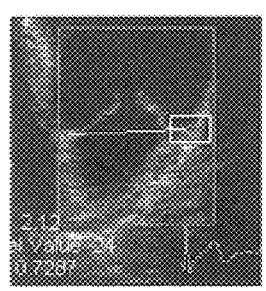
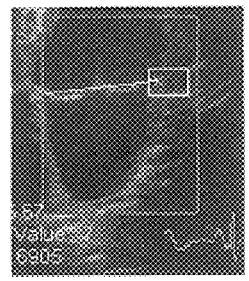
FIG. 14A  FIG. 14B

AUTONOMOUS BOUNDARY DETECTION SYSTEM FOR ECHOCARDIOGRAPHIC IMAGES

This application is a continuation-in-part of U.S. application Ser. No. 09/139,688, filed Aug. 25, 1998, now abandoned the entire contents of which is specifically incorporated herein by reference in its entirety.

BACKGROUND OF THE INVENTION

1. Field of the Invention

The invention relates to an efficient system for autonomous determination of the left ventricle (LV) epicardial and endocardial borders of a human heart. Echocardiographic image sequences are acquired from an apical four-chamber view of the heart or from an apical two-chamber view and subsequently processed to provide near-real-time approximations of endocardial borders and estimates of wall thickness.

2. Description of the Related Art

Ultrasound Imaging

Two-dimensional ultrasonic imaging is used as an important non-invasive technique in the comprehensive characterization of a number of body organs. In ultrasonic imaging, a sound pulse is emitted from a transducer towards the organ being imaged. The pulse attenuates and then reflects when it hits a medium with an acoustic impedance different from that of the medium in which the pulse is traveling. The time the sound pulse takes in transit is a measure of the distance of the boundary from the transducer, and the amount of energy that is reflected is a measure of the difference of the acoustic impedance across the boundary. (In practice, because the energy of the pulse diminishes as it travels, post-processing of the reflected signal includes time gain control that compensates the attenuation of the signal over time). Assuming the pulse travels at a single speed in the body, and by emitting pulses across a plane, a two-dimensional record of the received energy in spatial coordinates represents a cross-sectional view of the imaged organ.

One advantage of ultrasound over other imaging modalities is its ability to generate real-time images of anatomy without using ionizing radiation. Historically, due to the relatively poor image quality and number of artifacts, ultrasound has not been used extensively for assessing physiology or organ function. The estimation of organ dimensions is a standard procedure, and velocity information from Doppler can be used to infer volume flow. However these measurements are time consuming and suffer from a large degree of operator variability. Despite these problems, efforts continue at practically applying ultrasonic techniques to a variety of applications.

Echocardiography

Echocardiography is the application of ultrasonic imaging to the heart. Echocardiography has experienced widespread acceptance in the evaluation of cardiac disease and in characterizing the structure and function of the heart. This acceptance is in large part due to its non-invasive nature, and its real-time capability for observing both cardiac structure and motion. A considerable amount of quantitative echocardiographic information can be obtained concerning cardiac anatomy, chamber diameter and volume, wall thickness, valve, and ejection fraction. The interest to the practicing physician is that if the endocardial border has been accurately approximated, then chamber cross-sectional area can be estimated. If the endocardial border has been accurately approximated at both end diastole (ED) and end systole (ES) then not only can the fractional area change (FAC) be calculated as the difference divided by the area at end-diastole, but the motion (or excursion) of the walls can be objectively characterized, as well. If, in addition, the epicardial border has been accurately found, then wall thickness estimates can be made to more objectively assess muscle in a possible infarct zone.

The real-time capability of echocardiography can be used to measure variation in the shape of heart structures throughout the cardiac cycle. These analyses require the complete determination of inner (endocardial) and outer (epicardial) boundaries of the heart wall and particularly those of the LV. Present evidence indicates that sensitive detection of ischemic disease with two-dimensional echocardiography requires knowledge of the endocardial border on echocardiographic frames throughout the cardiac cycle as well as at end-diastole and end-systole (Weyman et al, 1984).

Because both global and regional left ventricular function are major variables used to determine prognosis in cardiac disease, there is considerable interest in the ability to quantitate function indexes from echocardiographic images. Presently, such indices (e.g., left ventricular chamber volume and left ventricular ejection fraction) are calculated from observer-defined cardiac boundaries traced on either the imaging device or an offline analysis. Tracing endocardial borders on two-dimensional echocardiograms is tedious and the selected borders are highly subjective. Indeed, in most systematic studies, substantial intra-observer and inter-observer variability has been found in such observer-defined cardiac boundaries.

Current methodology relies on human observers to draw boundaries of the epicardial and endocardial borders in order to calculate indices of heart function and health. Typically, in current ultrasound machines, a track ball is incorporated as the drawing implement. Using this track ball a cursor can be moved beginning at the mitral valve (MV) annulus (MVA) around the endocardial contour to the opposite MVA position and accepted. Once this is accepted, the volume can be calculated from a single plane prolate ellipsoid model or a model of summation of discs. This procedure is performed at both ED and ES to calculate ejection fraction (EF), i.e., $EF=((V_{ED}-V_{ES})/V_{ED}) \times 100\%$. If the view that is approximately perpendicular to the current apical view is also available, the same drawing procedure can be used on the respective end diastolic or end systolic frame and a biplane summation of disc method used to supply the volumes for the above calculation of EF. In off-line analysis systems, the same type of drawing tool is implemented although usually the drawing implement is a mouse instead of the track ball.

In the last few years, the field of echocardiography has undergone rapid change, with advances in image quality and the advent of new imaging methods (Entrekin, R et al., 1999; Lees, W., 1999; Leen, E., 1999; Becher et al., 1999). These new applications can be split into two categories:

1) Automatic assistance for measurements that are typically done manually to both improve repeatability, and reduce exam time. Examples include the tracing of the borders of the LV to enable calculations of parameters such as ejection fraction and cardiac output and the tracing of the intima-media complex to assist with the early detection of atherosclerosis.

2) Determination of new diagnostic information from many of the newly developed modes. Examples here include estimation of organ perfusion and the use of Doppler processing in tissue to assess cardiac wall motion or myocardial compliance.

In both cases, the development of new quantitative techniques requires extended clinical testing to ensure not only the technical relevance of the measurements, but also the clinical efficacy, particularly for new applications.

There are several currently available automated analysis echocardiographic systems. One is an ultrasound machine marketed by Hewlett-Packard (Sonos, 5500 Imaging System). While this system incorporates many automatic features, it is very gain- and operator-dependent. With this dependence on operator control or gain settings, many of the issues concerning inter and intra-observer variability remain unresolved. A similar system is offered by GE/Vingmed, which has met with similar lack of success.

Deficiencies in the Prior Art

Current procedures are time consuming, often requiring several minutes to obtain at least a rough estimate of an endocardial border. In many cases, time is an urgent consideration in assessing the status of heart patients and decisions may be made without information that would lead to a more informed decision on the most appropriate procedure. An additional disadvantage is the large inter-observer and intra-observer variability in measuring the parameters used to determine heart chamber boundaries. A great deal of "dropout" can occur in certain areas of the endocardial contour. Depending on the observer, these dropout regions may be visually interpolated with varying experience and care. When the images are viewed in real time motion, small targets can be seen to move in specific patterns that suggest to the observer that they are associated with the endocardium and are thus part of this boundary. When the images are frozen and the motion information is lost to the observer, it becomes very difficult to pick which of the numerous small points of brightness on the screen had been the ones associated with the appropriate motion pattern. Thus, especially in marginal images, the resulting inter- and intra-observer variability can be quite large. This is demonstrated by the reported increase in variability associated with the perceived image quality as reported (Geiser, 1988).

Manually defining such boundaries becomes increasingly labor intensive when the analysis of a complete cardiac cycle is needed to provide a description of the systolic and diastolic wall motion pattern, or when a number of echocardiographic frames have to be processed in order to obtain a long period time-history of cardiac function. Unfortunately, automating the identification of boundary regions in echocardiograms using computers is often difficult because of the poor quality of the echocardiographic images. The lack of clear definition of the boundary regions is due to the intrinsic limitations of echo imaging, such as low image intensity contrast, signal dropout in the image, and boundary discontinuity in any given frame. "Dropout" occurs where sound waves are reflected from two different levels in a structure and the reflected waves arrive simultaneously, but out of phase, at the face of the transducer, causing a cancellation of their amplitudes. Thus, no return signal is perceived at that depth.

The poor quality of echocardiograms is also attributable to reverberations of the initial sound pulse, and "speckle" noise, caused by the back scattering of the incident wave front after it hits tissue microstructures. This phenomenon superimposes a very fine texture, a "salt and pepper" pattern, on the image. Another limitation of echocardiographic imaging is that sound reflection is not very pronounced when the angle between a boundary of the heart and the propagation path of the sound pulse is small. Hence, the lateral wall (LW) boundaries of the heart are usually not very well defined in echocardiographic images. Thus, in imaging the LV, typically the anterior and posterior cardiac walls are most well defined.

In the past several years, advances in computer data processing technology have allowed the application of several different automatic boundary detection methods to echocardiographic images. However, most researchers have had difficulties with image enhancement and boundary detection with echocardiographic images because of the low signal-to-noise ratio and large discontinuities in such images. Thus, automated border detection has been reported in two-dimensional echocardiographic images, but only when the images are of good quality and certain smoothing techniques are employed prior to edge detection in order to render the endocardial edge more continuous. An overview of the field has been described in Kerber (1988).

It is therefore desirable to automate as much as possible the determination of boundaries of echocardiographic images. Automated definition of the boundaries would improve the reliability of the quantitative analysis by eliminating the subjectivity of manual tracing. Consequently, there is a need for a method to automatically determine quantitative characteristics of ultrasonic images, especially echocardiographic images. In particular, there is also a need for a method that will automatically determine the center of an imaged structure and approximate the borders of such a structure. With respect to echocardiographic images, there is a need for an automated system that can determine the center of the LV, approximate both the endocardial and epicardial borders, and estimate cardiac wall motion without user input. In addition, it is also desirable to automatically detect the presence of a flattened interventricular septum caused by pressure or volume overload from the RV.

The present invention is directed to resolving one or all of these problems mentioned above.

SUMMARY OF THE INVENTION

The invention comprises a method and apparatus for generating a synthetic echocardiographic image. The method comprises first obtaining, for a plurality of pathologically similar reference hearts, a reference echocardiographic image of each reference heart at ES and at ED. Next, the coupled epicardial and endocardial borders are identified in each echocardiographic image. An epicardial/endocardial border pair is then modeled from the identified borders. The method then locates a plurality of predetermined features in the reference echocardiographic images. The predetermined features are then located in the subject echocardiographic image from the location of the predetermined features in the reference echocardiographic images. The modeled epicardial/endocardial border pair is then mapped onto the subject echocardiographic image relative to the location of the predetermined features in the subject echocardiographic image.

The apparatus generally comprises an echocardiographic machine for obtaining the echocardiographic images that are then processed by a computing system. In one aspect of the invention, the invention comprises such a computing system programmed to perform the autonomous portions of the method. In another aspect, the invention comprises a program storage medium encoded with instructions that perform the autonomous portions of the method when executed by a computer.

BRIEF DESCRIPTION OF THE DRAWINGS

The invention may be understood by reference to the following description taken in conjunction with the accompanying drawings, in which like reference numerals identify like elements, and in which:

FIG. 12A and FIG. 12B depict two exemplary convolution templates employed to locate the medial and lateral Mv annuli, respectively, in the subject image;

FIG. 13A and FIG. 13B illustrate maximal and final search regions for the medial MV annulus (MMVA) at ED and ES;

FIG. 14A and FIG. 14B illustrate maximal and final search regions for the lateral MV annulus (LMVA) at ED and ES;

Figure 1:
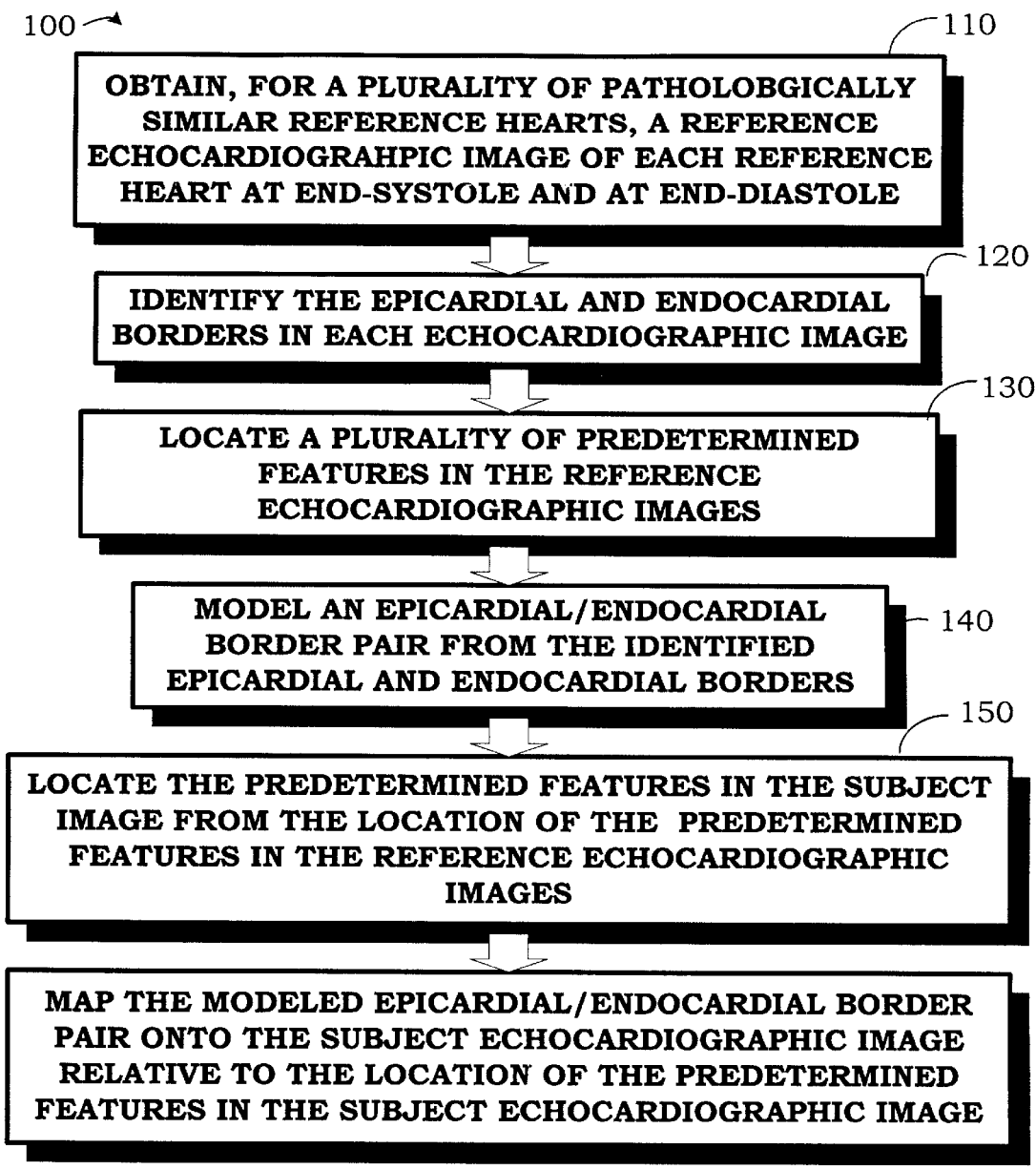
FIG. 1 illustrates a method for generating a synthetic echocardiographic image in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF ILLUSTRATIVE EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

A Method for Generating a Synthetic Echocardiographic Image

Turning now to the drawings, FIG. 1 illustrates a method 100 for autonomously detecting boundaries in a subject echocardiographic image of a subject heart in accordance with the present invention. Note that the method 100 shall, for the sake of clarity, be disclosed in the context of an apical four-chamber view of the LV. However, the invention is not so limited and may be used with other views. For example, some embodiments might employ a two-chamber view or a parasternal short-axis view.

Figures 2A, 2B:
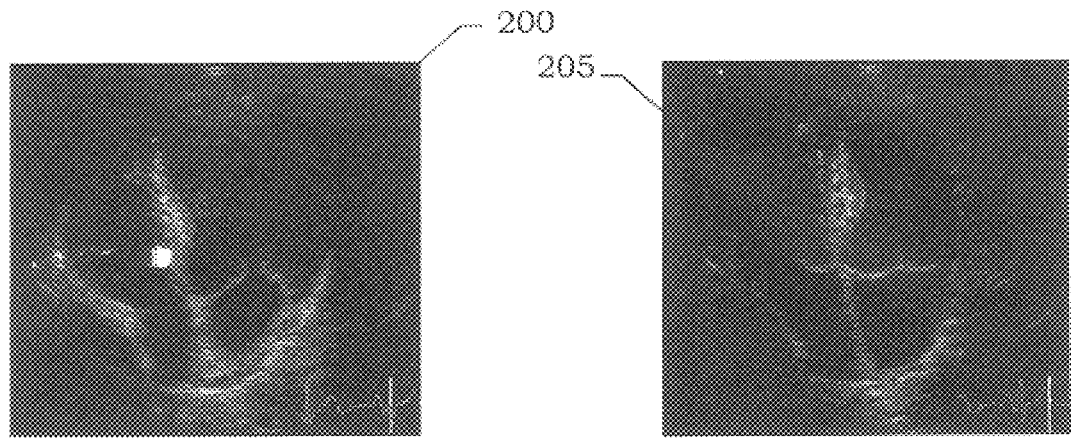
FIG. 2A and FIG. 2B are typical apical 4-chamber images at ED and ES, respectively, such as may be employed in one particular embodiment of the invention.

Obtaining Echocardiographic Images of a Plurality of Pathologically Similar Hearts The method 100 begins by first obtaining, for a plurality of pathologically similar reference hearts, an echocardiographic image of each reference heart at end-systole and at end-diastole, as set forth in the box 110. These echocardiographic images shall be referred to herein as "reference" echocardiographic images. FIG. 2A and FIG. 2B depict typical apical 4-chamber images 200, 205 at ED and ES, respectively, such as may be used in one particular embodiment. Any known method and/or apparatus for obtaining such echocardiographic images may be employed.

"Pathologically similar," as used herein, means at least that the reference hearts all manifest some particular pathological condition, such as normalcy, pericardial effusion, apical aneurysm, dilated cardiomyopathy, etc. The particular condition is not material to the practice of the invention. Each reference heart will be selected for this use because of its manifestation of the pathological condition. Ideally, the reference hearts will all exhibit the pathological condition to the same, high degree. However, as those in the art having the benefit of this disclosure will appreciated, the degree of similarity will vary among various embodiments by the availability of reference hearts. Thus, different implementations of the present invention will exhibit some variation in the degree of similarity among the reference hearts.

As those in the art having the benefit of this disclosure will appreciate, obtaining echocardiographic images typically begins by capturing frames from a video produced during an echocardiographic examination. The expert then places the system in freeze mode to capture the digitized image data and selects a representative systolic cardiac sequence. These capabilities are typically employed in conventional echocardiographic systems and any known system may be used for this purpose. However, many state of the art systems permit direct access to the digitized images, in which case the expert need merely select the reference images from among those already saved.

Identifying Epicardial and Endocardial Borders in Each Echocardiographic Image

Figures 3A, 3B:
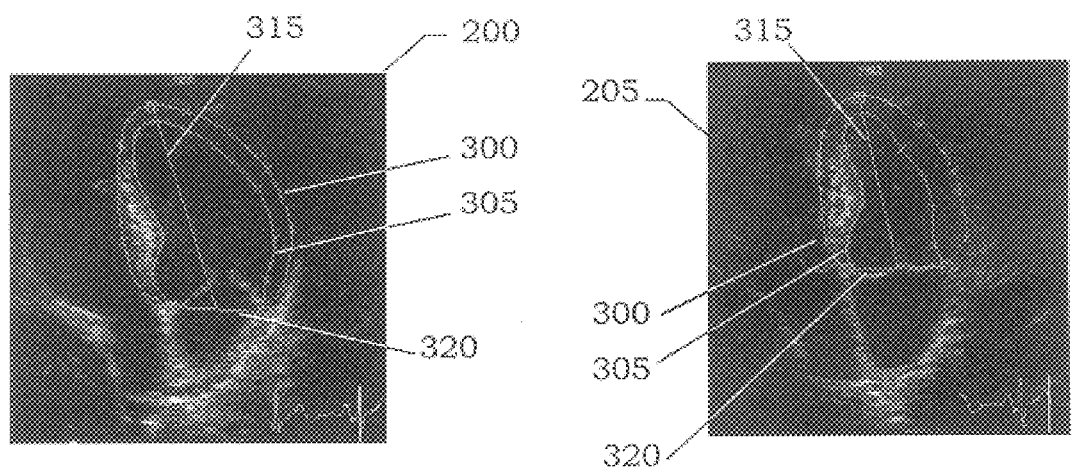
FIG. 3A and FIG. 3B depict the images of FIG. 2A and FIG. 2B bearing expert-drawn tracings identifying the epicardial and endocardial boarders.

The method 100 then proceeds by identifying the coupled epicardial and endocardial borders in each reference echocardiographic image, as set forth in the box 120. This may be accomplished by using conventional practices whereby by experts identify and trace the epicardial and endocardial borders on each of the images. Alternatively, some form of autonomous border detection such as is known to the art may be employed. FIG. 3A and FIG. 3B illustrate the images 200, 205 of FIG. 2A and FIG. 2B bearing such expert-drawn tracings identifying the coupled epicardial border 300 and endocardial border 305. The images with the drawn borders may then be digitized and stored on a computer in some convenient format. Any known technique for digitizing the images with the borders traced thereon may be employed.

In one particular embodiment, discussed more fully below, the expert employs an autonomous boundary detection system to compute the boundaries automatically. The expert then observes the autonomously detected borders superimposed onto the image and, if necessary, manually modifies the borders to a more correct position. In this particular embodiment, the autonomous boundary detection system also calculates and/or displays measurements of cardiac function such as chamber area, chamber volume, fractional area change, volume ejection fraction and regional wall motion.

Locating a Plurality of Predetermined Features in the Reference Echocardiographic Images The method 100 also identifies a plurality of predetermined features in the reference echocardiographic images, as set forth in the box 130. In one embodiment, this identification is performed at the same time as the identification of the endocardial and epicardial borders in the box 120. Returning to FIG. 3A and FIG. 3B, the traces 315, 320 are used to locate a prominent feature, e.g., the MVA, therein. Furthermore, the location in the box 140 and the identification in the box 120 may be performed on different copies of the same images. It will nevertheless generally be preferred to have the same experts perform the identification in the box 120 and the location in the box 140 on the same copies of the echocardiographic images to reduce variability in the data.

The number and identity of the predetermined features will be to some degree implementation specific. In the implementation for the apical four-chamber view, the predetermined features are the MMVA position, the LMVA position, and the EA of the LV. The predetermined features should be sufficiently prominent that the experts can locate them in the echocardiographic images. As will be appreciated by those skilled in the art having the benefit of this disclosure, the particular view represented in an echocardiographic image may also limit the prominent features that may be selected.

Figure 4A:
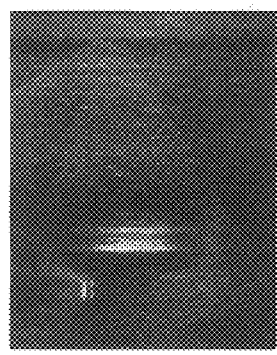
FIG. 4A and FIG. 4B depict synthetic images created from identified borders such as those illustrated in FIG. 3A and FIG. 3B.
Figure 4B:
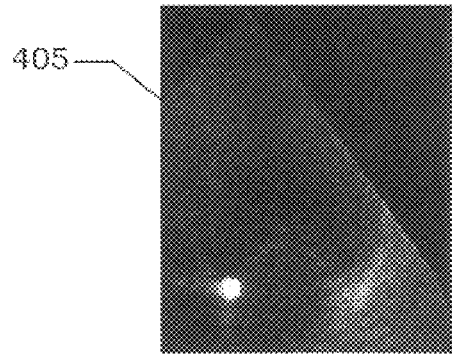

Modeling an Epicardial/Endocardial Border Pair From the Identified Epicardial and Endocardial Borders The method 100 next models an epicardial/endocardial border pair from the identified epicardial and endocardial borders, as set forth in the box 140. FIG. 4A and FIG. 4B illustrate two such synthetic images 400, 405. Typically, this will involved some kind averaging the identified epicardial and endocardial borders, but the invention admits wide variation. In one particular embodiment discussed more fully below, the identified borders are mathematically manipulated before averaging. The average of the identified borders is then mapped into a synthetic image using suitable techniques, such as spline transformations.

Locating the Predetermined Features in a Subject Image from the Location of the Predetermined Features in the Reference Echocardiographic Image The method 100 then locates the predetermined features in the subject echocardiographic image from the location of the predetermined features in the reference echocardiographic images, as set forth in the box 150. In the illustrated embodiment, this search for prominent features proceeds in a step-wise, autonomous, and hierarchical manner so that a location found for a feature at one step guides the search for a feature in subsequent steps. In one particular embodiment discussed more fully below, the identified predetermined features are used to identify a portion of the synthetic image most likely to contain the predetermined feature through the creation and application of a filtering function.

Mapping the Modeled Epicardial/Endocardial Border Pair onto the Subject Echocardiographic Image Relative to the Location of the Predetermined Features in the Subject Echocardiographic Image The method 100 then concludes by mapping the modeled epicardial/endocardial border pair onto the subject echocardiographic image relative to the location of the predetermined features in the subject echocardiographic image, as set forth in the box 160. Again, the invention admits variation in how this might be done. In one particular embodiment discussed more fully below, the mapping includes transforming the modeled epicardial border into the subject echocardiographic image, adjusting the epicardial borders along the septal and LWs, transforming the endocardial border into the image, and adjusting the endocardial border along the septal and LWs.

Implementing the Invention in Software on a Computer System

As may be apparent from the above discussion, some portions of the method of the invention will typically be software implemented. Illustrative embodiments of a software implementation of the invention from a functional perspective are described below. In the interest of clarity, not all features of the actual implementation are described. It will of course be appreciated that in the development of any such actual embodiment, numerous implementation-specific decisions must be made to achieve the programmers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Since the invention will typically be implemented, at least in part, in software, some portions of the detailed descriptions herein are consequently presented in terms of a software-implemented process involving symbolic representations of operations on data bits within a computer memory. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

An Exemplary Computer System Employing a Stand-Alone Computer Device

Figure 5:
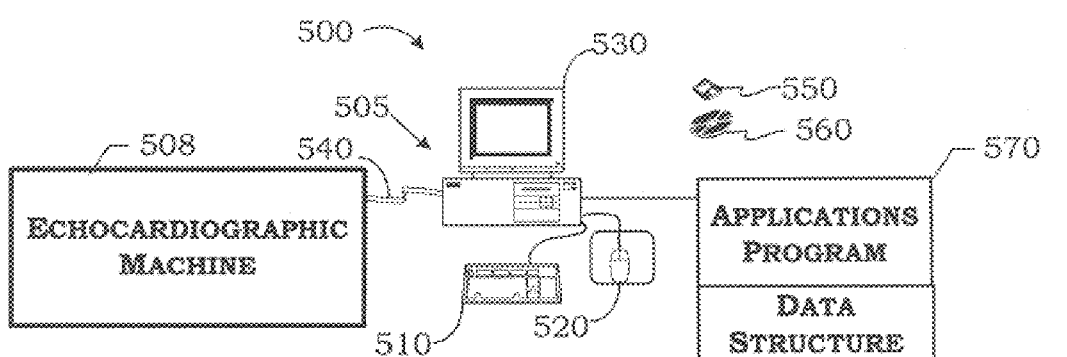
FIG. 5 illustrates one particular embodiment of an apparatus with which the invention may be practiced, the apparatus including an echocardiographic machine and a computing system.

FIG. 5 illustrates a computer system 500 including a computer 505 programmed implement the present invention in conjunction with the echocardiographic machine 508. Note that, in the particular implementation of the computer system 500 illustrated, the computer 505 is a desktop personal computer. However, the invention is not so limited. The computer 505 may also be, for instance, a workstation, a laptop computer, a handheld computer, or even a network server, in various alternative implementations.

Returning to FIG. 5, the computer system 500 includes standard input/output devices such as a keyboard 510, mouse 520, and monitor 530 with which a programmer may interact with the software loaded on the computer 505. This interaction is performed in accordance with conventional practices by which programmers interface with software. The computer system 500 may include a network connection 540 so that a programmer may interface with other computers over a network (not shown) through the computer system 500. However, this is not necessary to the practice of the invention. In the particular embodiment illustrated, the computer system 500 is interfaced with an echocardiographic machine 508 over the connection 540. Note also that the particular operating system implemented on the computer 500 is not material to the practice of the invention. The computer 500 may, without limitation, implement a Windows®, UNIX, or a Microsoft Disk Operating System ("MSDOS")-based operating system, for instance.

FIG. 5 also illustrates a magnetic floppy disk 550 and an optical disk 560. The software of the present invention may be encoded on a variety of program storage media, whether optical, magnetic, or otherwise in nature, such as the floppy disk 550 and the optical disk 560. The software may also be encoded on the hard disk (not shown) of the computer 505. Thus, in alternative embodiments, the invention may comprise instructions that, when executed by a computer, perform a method in accordance with the invention. Similarly, the invention may comprise a computer, e.g., the computer 505, programmed to implement the method.

The software of the invention can be conceptualized as an applications program 570 and one or more data structures 580. One or both of the applications program and the data structure(s) may be encoded on one or more of the program storage media in the computer system 500. Note that the language in which the applications program 570 is written and the type of structure in which data is stored are not material to the practice of the invention. These types of details will be implementation specific. For further information, a general treatment of programming languages and data structures, including relative strengths and weaknesses, may be found in *The Computer Science and Engineering Handbook,* pp. 86–110, 977–1190, 1981–2256 (Allen B. Tucker, Jr., Ed.-in-Chief, CRC Press, 1997; ISBN 0–8493–2909–4). Thus, the data structures 580 may be any suitable data structure known to the art, e.g., a database, a linked list, etc.

The data structure(s) 580 contain selected images of selected organ systems. More technically, the data structure(s) 580 contain data representing images of selected organ systems. However, the term "image" as used herein shall encompass not only the display of such data, but the data itself. The term "image" as used herein therefore does not necessarily imply that the data is being displayed. In one particular embodiment, several data structures 580 are employed. The data structure 580 in this particular embodiment contains images of "healthy" or "normal" hearts but may, in alternative embodiments, contain images of hearts exhibiting one or more conditions that may be classed as abnormalities or pathologies.

Exemplary, Networked Computer Systems

Figure 6:
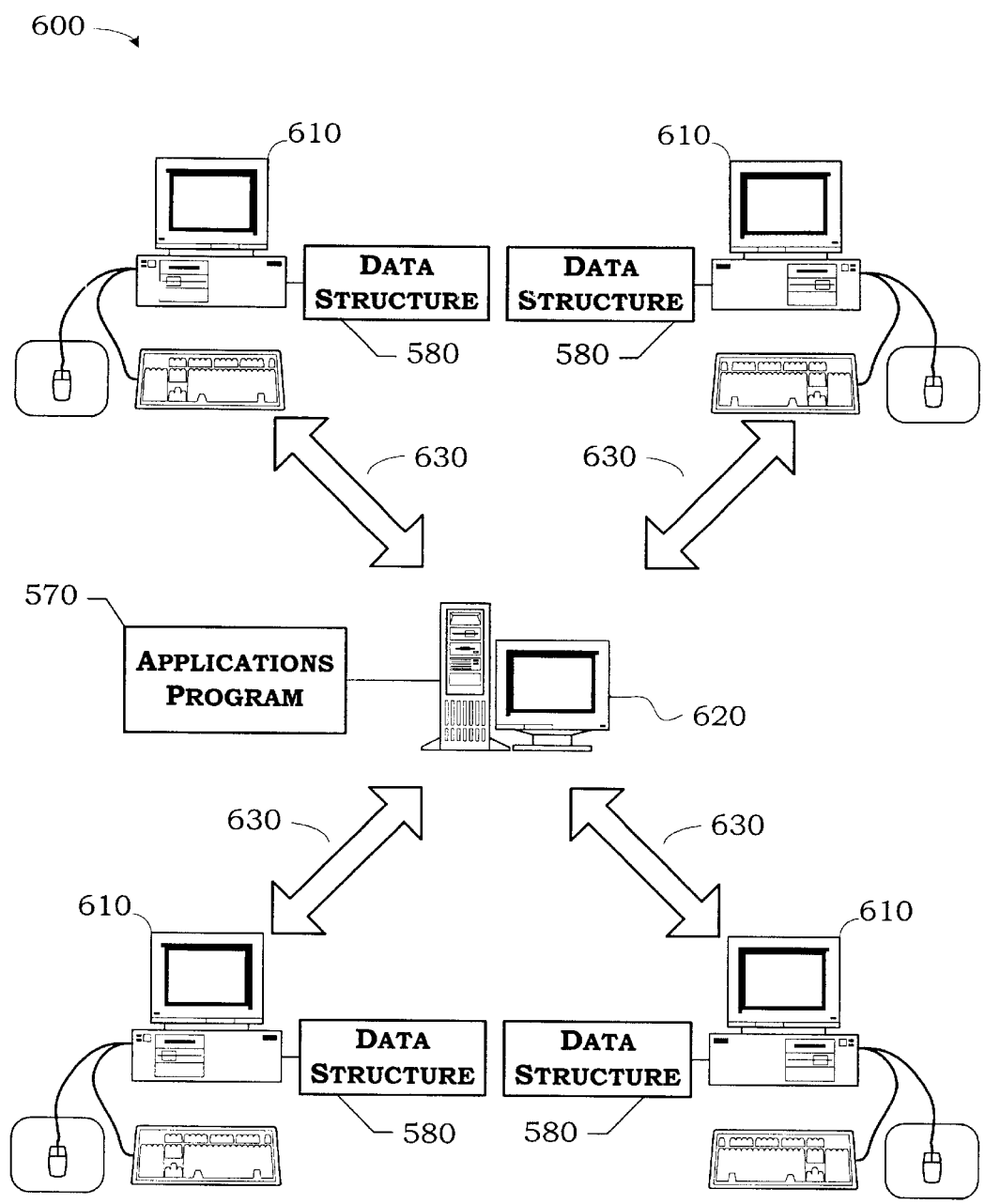
FIG. 6 illustrates one particular embodiment of a networked computing system such as may be used in accordance with some alternative embodiments.
Figure 7:
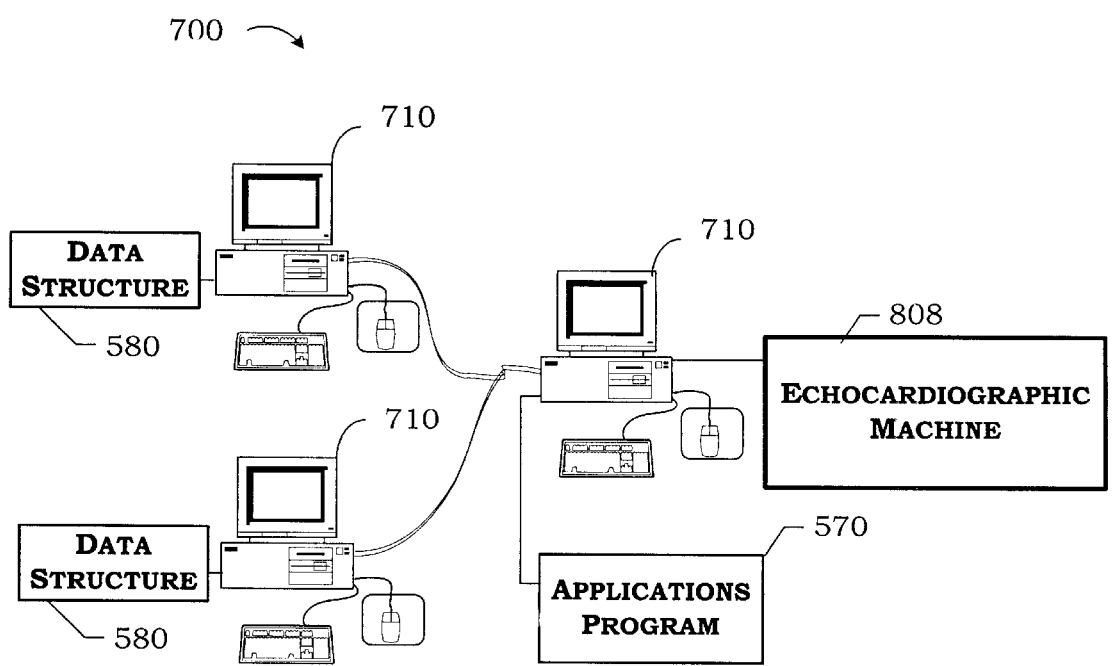
FIG. 7 illustrates one particular embodiment of an apparatus with which the invention may be practiced, the apparatus including an echocardiographic machine and a computing system, the computing system being networked.

FIG. 6 and FIG. 7 illustrate alternative embodiments for the computer system 500 of FIG. 5. The invention admits wide variation in equipment, communications protocols, certain applications software, and transmission media, as will become apparent from the following discussion. Indeed, the invention is not limited by these factors. Each of these factors will be implementation specific. The particular embodiment of the computer system 600 shown in FIG. 6 and computer system 700 in FIG. 7, like the computer system 500 in FIG. 5, are exemplary only, and are set forth to further an understanding of the invention.

The computer systems 600 and 700 are both networked. The computer system 600 comprises a plurality of networked computers 610 communicating with a network server 620 over a plurality of corresponding communications links 620. The illustration in FIG. 6 vaguely resembles a local area network ("LAN") configured in a star topology although the invention is not so limited. For instance, the computer system 600 may, in some embodiments, be a wide area network ("WAN") or may even comprise a part of the Internet. Indeed, not all embodiments are even networked, as is the case for the computer system 500 in FIG. 5. Similarly, although the particular embodiment illustrated in FIG. 6 employs a client/server architecture, any suitable architecture known to the art may be used, e.g., a peer-to-peer architecture. The computers 710 of the computer system 700 in FIG. 7, for instance, are configured in a peer-to-peer architecture. Note also that, in client/server architectures, more than one server 620 might be employed.

The communications protocols and types of computing devices also will be implementation specific. The computer systems 600, 700 may also utilize any suitable communications protocol, e.g., an Ethernet or a token-ring network protocol. The communications links 630, 720 may be implemented using any suitable transmission media known to the art, including without limitation optical fibers, co-axial cables, and twisted wire pairs. In some embodiments, the communications links 630, 720 might even be wireless links. The computers 610, 710 illustrated are all desktop personal computers. However, the invention is not so limited. The computers 610, 710 might be some other type of computing device, for instance, a workstation, a laptop computer, or a handheld computer.

Note that the computing systems 600, 700 both include multiple data structures 580. These may provide data redundancy in some embodiments. In other embodiments, however, the data structures 580 may contain different data. More particularly, the method 100 in FIG. 1 may be used to create a first data structure 580 whose data represents a first pathology and then a second data structure 580 whose data represents a second pathology. This may be extended in principle to include numerous data structures whose data manifests numerous pathologies in some embodiments.

The Software Implementation of the Method of the Invention

In accordance with standard networking principles, the situs of the applications program 570 and the data structure(s) 580 is flexible. In FIG. 6, the applications program 570 resides on the server 620 while the data structures 580 are distributed across the computers 610. However, the application program 570 and data structures 580 could all reside on the same computing device 610, 620 or be distributed across the networked computing system 600 in some other manner. Similarly, the applications program 570 and the data structures 580 are illustrated evenly distributed across the network 710, but may be distributed in some other manner. In the stand-alone embodiment of FIG. 5, this is not a consideration.

Conclusion on Implementation on a Computer System

Thus, the particular hardware in the various embodiments of the present invention will be specific to a particular implementation. The computer system 600 may be as simple as the computer system 500 in FIG. 5, as intensive as a main frame computer hosting dozens of time sharing users, or as distributed as a bunch of networked computers, e.g., the computer systems 600, 700 of FIG. 6 and FIG. 7. Also, although not shown, the elements of the computing system might alternatively be embedded in the echocardiograph machine. Thus, the invention is, in one aspect, a software implemented method for analyzing data as is discussed more fully elsewhere as opposed to the hardware. In other aspects, the invention comprises a program storage medium encoded with the software capable of implementing the method and/or a computer programmed to implement the method. The program storage medium may be magnetic, such as the floppy disk 560, or optical, such as the compact disk, read only memory ("CDROM") 570, both shown in FIG. 5, or some other type of medium capable of storing the computer instructions.

EXAMPLES

The present invention provides a fully automated method for finding the epicardial and endocardial borders for an echocardiographic image sequence acquired from the 4-chamber view. The method represents a "top down" approach that is robust when confronted by confusing image information such as speckle, moderate dropout, motion, intra-cavitary structures such as the papillary muscles and chordal apparatus. The following examples are included to demonstrate preferred embodiments of the invention. They illustrate more fully the system and software that drives one particular embodiment of the invention disclosed above. However, those of skill in the art should, in light of the present disclosure, appreciate that many changes can be made in the specific embodiments which are disclosed and still obtain a like or similar result without departing from the spirit and scope of the invention described in the appended claims.

Example 1

Autonomously Detecting Boundaries in a Subject Echocardiographic Image of a Subject Heart Using an Apical Four-Chamber View This example comprises a fully automated computer-based algorithm that identifies the epicardial and endocardial borders of the LV for echocardiographic image sequences acquired from the apical 4-chamber view during systole. Since the fractional area computation requires area estimates at both ED and ES, the first and last borders in the sequence are of particular interest. Difficulties encountered with this view include a complex shape, poor image information along the LW, poor image information at the apex, and the fact that the LV must be distinguished from the other 3 chambers present in the image. The dynamic motion and changing shape of the MVA create additional problems since it may move upward through the image by as much as 18 mm during systole and the MV may (or may not) be open (or partially open) for some image frames during the cycle. Despite these difficulties, the view is of interest because the length of the LV chamber axis can be combined with endocardial border cross-sectional diameters to estimate the chamber volume, stroke volume, and ejection fraction (EF).

This embodiment applies a "top-down" approach, where a search is first made for three prominent features. The first search is for the MMVA; the second is for the LMVA; and the third is for the EA. Prior information gleaned from the data set of expert tracings is used to control the search for each of these three features. Since the borders for this view are too complex to be modeled as elliptical arcs, a geometric model consisting of two coupled contours (one for the epicardium and one for the endocardium) was formed by applying the method of Procrustes (Bookstein, 1997; Kendall, 1984) to average a plurality of tracings (in this case, 36 expert tracings). Baldock (1992) and Kotcheff et al. (1997) have discussed other methods for creating geometric models for echocardiographic images. Since the epicardial border is again considered more prominent than the endocardial border, it is searched for first. Once the epicardial border has been found, it is used to create a thin-plate spline transformation (Bookstein, 1991) to map the endocardial portion of the model into the image. The position of the epicardial border is then used to control the extent of two warps of the endocardial border to a more accurate fit.

Obtaining Reference Echocardiographic Images of a Plurality of Pathologically Similar Hearts FIG. 2A and FIG. 2B depict typical apical four-chamber images at ED and ES such as may be used in one particular embodiment. Any known method and/or apparatus for obtaining such echocardiographic images may be employed. The images should be obtained in as close to the "optimal plane" as possible. The "optimal plane" definitions are standardized in the art, and the most concise recent description/definition is found in Weyman, A. E., "Standard Plant Positions—Standard Imaging Planes," *In Principles and Practice of Echocardiography*, Second Edition, edited by Weyman, A. E., Lea & Febiger, Philadelphia. This particular implementation employs harmonic imaging where visualization of the endocardium is optimized.

These particular images are selected from an image sequence in accordance with conventional practice. The image sequence was captured without echo contrast agents (e.g., Albunex or Optison) and acquired from the standard viewing plane. The depth settings were such that the portion of the MVA closest to the septal wall (SW) appears in the lower half of the image. The ED and ES were the first and last frames in the image sequence. While the methods are designed to search for the borders in an environment of noise and dropout, the images were acquired so that the dropout along the septal and LWs is minimized, chest wall artifact has been reduced, and the TGC settings set to lower the pixel intensities in the left atrium (LA).

The enlisted experts first observed the apical four-chamber (or two-chamber) image sequence for a patient until optimized for quality. The selected images were of good quality, had matched horizontal and vertical resolutions, had an image sector angel of 90°, fully sectored, and not in a windowed format. The vertex of the sector scan was placed at the mid column position in the image. The image resolution (i.e., pixel/millimeter ratio) was made available. Note that the epicardial border should be contained entirely within the sector scan and the line through the center of the LV chamber should be close to vertical.

Identifying Epicardial and Endocardial Borders and Locating the Predetermined Features in Each Reference Echocardiographic Image Once digitized image data was captured and the expert had selected a representative systolic cardiac sequence, the expert manually traces the borders on the image using software developed for this purpose. The predetermined features are also manually identified at this time. The identified borders and the locations of the predetermined features are stored for subsequent processing described below. In some particular embodiments, the autonomous boundary detection system also calculated and displayed measurements of cardiac function such as chamber area, chamber volume, fractional area change, volume ejection fraction and regional wall motion.

Figure 11A:
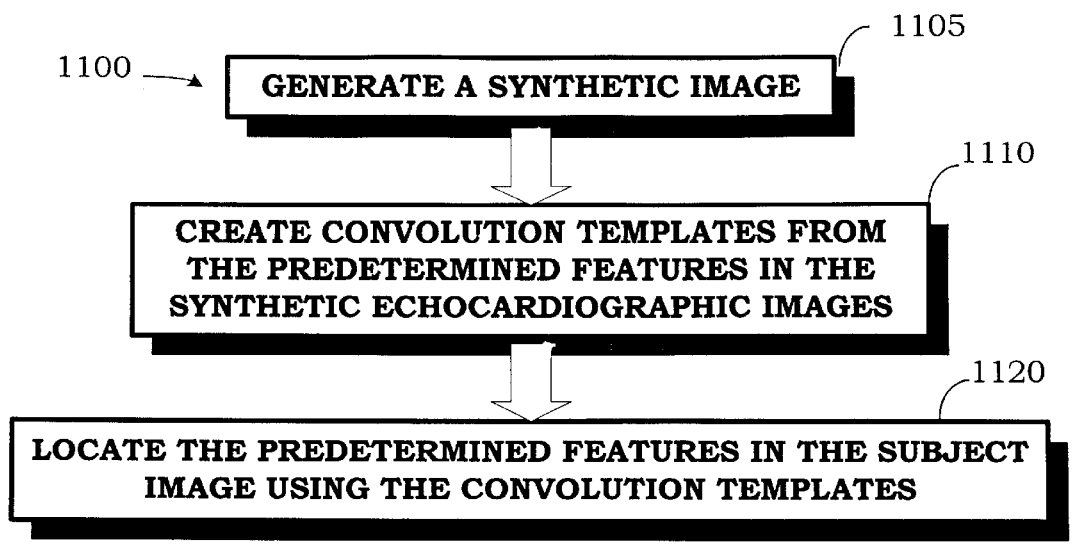
FIG. 11A illustrates one particular implementation for locating the predetermined features in the subject image.

Locating the Predetermined Features in the Subject Echocardiographic Image from the Location of the Predetermined Features in the Reference Echocardiographic Images In this particular embodiment, locating the predetermined features in the subject image proceeds in several phases. One particular implementation 1100 is illustrated in FIG. 11A and proceeds as follows:

generating a synthetic echocardiographic image at ES and at ED from the reference echocardiographic images at ES and at ED, respectively, as set forth in the box 1105;

convolution templates are then formed from the location of the predetermined features in the synthetic echocardiographic image, as set forth in the box 1110; and the predetermined features are then located in the subject echocardiographic image using the convolution templates, as set forth in the box 1120.

Each operation shall now be discussed in turn.

Generating a Synthetic Echocardiographic Image

Figure 9:
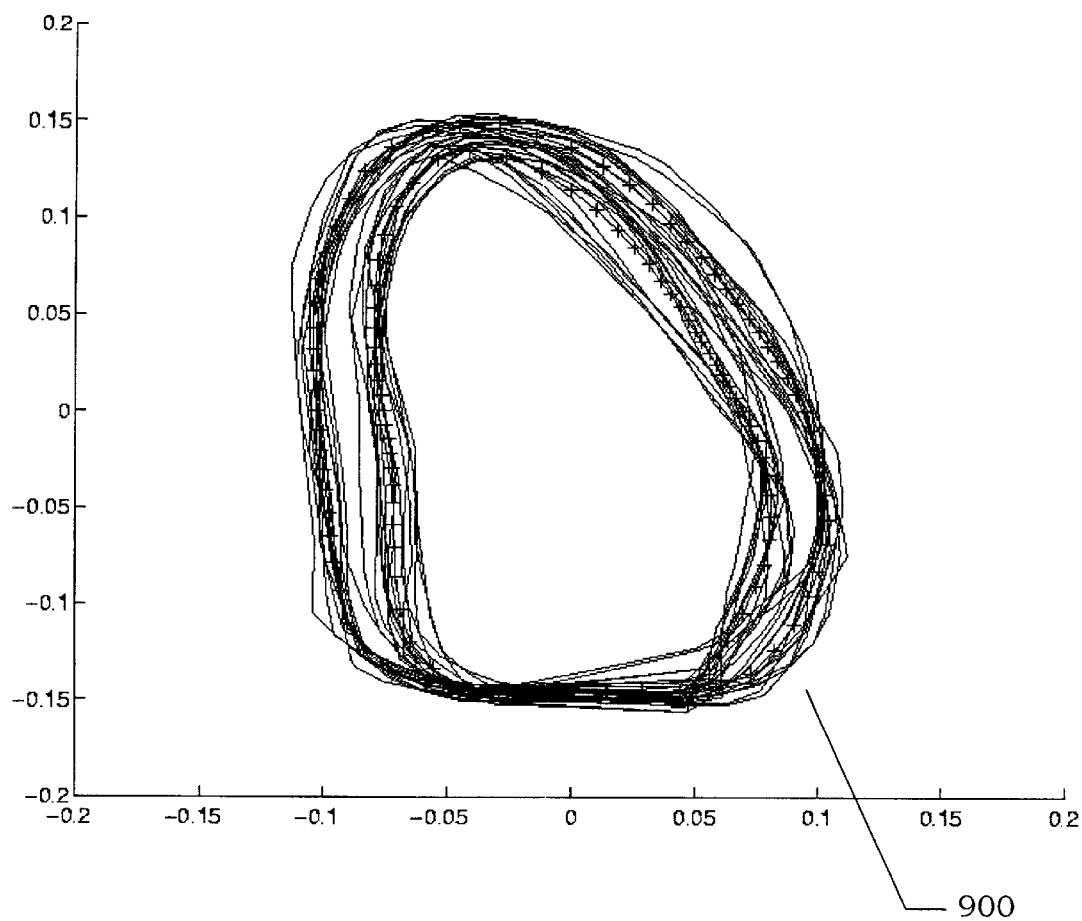
FIG. 9. depicts a plurality of identified border pairs being processed during the modeling of FIG. 8.

The synthetic echocardiographic image is generated during the creation of the Procrustean model during the modeling process discussed below in connection with the modeling that occurs in box 140 of FIG. 1 in this particular embodiment. In brief, the borders identified in the reference echocardiographic images are processed, as is shown in FIG. 9. This processing includes rotating the identified borders so that they are aligned in the MV plane. The processed borders are then linearly mapped into the synthetic image. Representative synthetic images 400, 405 are illustrated in FIG. 4A and FIG. 4B.

Creating Convolution Templates

Convolution templates, more technically known as a "convolution filters," are first created from the predetermined features location in the synthetic echocardiographic images 400, 405, as set forth in the box 1110 of FIG. 11. Different templates are constructed for different ones of the predetermined features. Exemplary templates 1200, 1205 for the MMVA and LMVA, respectively, of the synthetic images 400, 405 of FIG. 4A and FIG. 4B are shown in FIG. 12A and FIG. 12B.

The filters 1200, 1205 are two-dimensional convolution filters on a rectangular region in the images 400, 405 and were extracted from the synthetic images as 52×39 and 50×48 subimages, respectively. The MMVA template 1200 was created from a 5 patient database (2 cycles/patient), while the LMVA template 1205 was created from a separate database of 8 patients (1 cycle/patient). While the MMVA template 1200 seems to capture the "L" shape of the myocardium near the MV/septal-wall/LV chamber interface, the LMVA template is not as well defined. While it would seem more reasonable to use the same synthetic image to create both templates, the best results were obtained with this two-pronged approach. However, alternative embodiments might choose to create both the templates 1200, 1205 from the same set of synthetic images 400, 405 despite the relatively inferior results.

The filter 1200, 1205 are created by averaging image data in neighborhoods of the expert estimates of this feature in a collection of images obtained in the box 140. While a first estimate of the region of computation is given by the minimum and maximum row and column estimates (in mm) made by the experts, this rectangle is restricted in this particular embodiment to improve the speed and accuracy of the algorithm. Some of the restrictions depend on a number of factors. In one particular implementation of this embodiment, these restrictions are implemented in the search for the predetermined features during their location.

Locating the Predetermined Features in the Synthetic Image

The predetermined features are then located in the synthetic image using the convolution templates, as set forth in the box 1120 of FIG. 11. A "top-down" or "global-to-local" approach is employed where the method begins with a search for the most prominent features first and then proceeds to incorporate this information into the search for the next most prominent feature. It has been demonstrated that if the SW and MV plane can be found, then the search for the portion of the MVA closest to the SW will have a better chance of success. (The search for the SW includes a check to avoid the RV freewall.).

The actual search is computed by finding the location in the image, where the output from large convolution filters, 1200, 1205, is maximized. The rectangular regions surrounding these locations were taken large enough to capture the "L" shape of the myocardium near the MV/SW/LV chamber interface. While the filter for the LMVA was designed in the same way and has a "backwards L" shape, the image data near the portion of the MV near the LW is much more variable. Results have shown that while the row location for the portion of the MV near the LW can be found quite reliably, the column may differ substantially from the estimate made by an expert. In this particular implementation, computations are begun a frame set to 2 before the frame at ES. The thought behind this strategy is that the MV may have already begun to open at the end-systole frame chosen, which confuses the search for the "L" shape characteristic of the portion of the MVA closest to the SW.

Each search is conducted using "large" convolution filters, e.g., 1200, 1205 that incorporate information from a block of pixel data. Thus, the point of view presented here is that traditional image processing methods for enhancing and denoising an image are best saved until estimates have been made for the location of certain key structures. Another viewpoint of the software is that the epicardial border is more prominent than the endocardial border. Thus, the search for the epicardial border is made first and then used to control the search for the endocardium.

FIG. 13A and FIG. 13B show the templates 1200, 1205 superimposed on the synthetic images 400, 405 of FIG. 4A and FIG. 4B to demark the respective search areas. Note that while the MMVA search region defined by the template 1200 avoids the LMVA, it does extend far enough into the atria that the maximum output-value from the matched filter could easily make a gross error in identifying the MMVA position. Thus, secondary logic will be required to further restrict the search region so that computations are only made near the MV plane. The final computation region for the computer-based algorithm is the small rectangle 1300 displayed in FIG. 13A. Note also that the maximal search region defined by the filter 1205 for the LMVA extends not only into the LA, but also into the expected location for the MMVA, which means that secondary logic will be required to limit the search to the small rectangle 1305.

In this implementation, the prominent features are the MMVA, the LMVA, and the EA location, and they are searched for in that order. While the search for the MVA is achieved through a matched filter approach with the templates displayed in FIG. 12A and FIG. 12B, the computations cannot be made throughout the image. If this strategy were to be adopted, the location where the templates best fit the image data will frequently be in the RV or in the left atrium (LA) or the right atrium (RA). Thus, the region of computation for the MMVA template 1200 must be restricted in some way. In our approach, the rows for the region of computation are restricted through a search for the MV plane. Once the position of the MMVA has been found, its position is used to limit the search for the LMVA. The locations of the two features, the axis of the LV chamber, the SW, and the LW are used to limit the search for the EA.

The Search for the MV Plane

This module encodes methods for finding the MV plane for an image acquired from the apical four-chamber view. The reason for interest in the MV plane for making automated measurements is that this anatomical structure usually forms a prominent feature in this type of image and thus provides a good starting point for placement of the epicardial border. If the image has been acquired by the sonographer with proper viewing angle, gain settings, and depth settings, and then the portion of the MVA closest to the SW will be in the lower central portion of the image. These two features delimit the MV plane.

The reason behind this search is that if the valve annuli can be located together with an approximation of the EA location, then a geometric model of the epicardial border can be mapped into the image using one of a number of different choices of interpolation schemes. Once this interpolation is completed, then other techniques can be used to "warp" this first estimate to a second more accurate one.

The technique underlying the search for the two points that delineate the MV plane in this particular embodiment is:

Create a convolution template that encapsulates the shape of the feature; (This task may be done off-line and saved to a file before the algorithm is initiated).

Determine a computation region using either expert or anatomical information and that can be automatically characterized and located in an image;

Compute the convolution within this region and save the location being the maximum output value for the convolution.

An important idea or concept being the use of the convolution operator is that they should preferably be called for an image frame near ES (and at a moment in time when the MV is closed) to determine an initial placement of the right and portion of the MVA closest to the SWs. Once these two features have been found for one image frame, the search for their locations in the other frames is conducted sequentially in a small rectangle containing an estimate from a nearby frame.

Note that the search for the portion of the MVA closest to the SW has a number of serious failure points. In particular, if the search region is too small for a particular image, then there will be no chance that the correct location will be found. If the search region is too large, then the risk of placing the portion of the MVA closest to the SW in the LA presents itself. The sonographer must be alerted to proper TGC and depth settings for accurate border placement.

The Search for the MMVA

In this particular implementation, all other computations are made relative to the location of this MMVA, so it should be found with a reasonable degree of accuracy. If not, then all subsequent computations will result in equally inaccurate estimates. Care should be taken to prevent placing the MMVA in the LA, middle of the MV, mid-portion of the septal and LWs, RV, or RA. One cause of the errors encountered in this implementation is that the MV may be open during the early portion of systole resulting in a poor match with the template. This problem can be reduced if the search is separated into two steps. The first step is to make an initial search for the MMVA at a frame near ES, where the valve is more likely to be closed. The strategies used to reduce gross errors in this search include using the a priori expert estimates from image database to limit the region of search, estimating the centerline through the LV chamber, estimating the column that best approximates the SW, and estimating the row that best approximates the MV plane.

Once this initial location has been found, the second step is to compute sequentially in the other image frames in the more restricted rectangles 1200, 1205 surrounding the MMVA location found in a nearby and already computed frame. If the output value of the matched filter (computed as the correlation coefficient) is above a minimum threshold value (currently set at 0.20), the new results are saved and the computations continue. Otherwise, the program is aborted. Note that computations begin at an image frame slightly before ES. The thought behind this strategy is that the MV may have already opened on the image frame chosen as end-systole. This eventuality will confuse the match between the convolution template and the "L" shape characteristic of the MMVA position in the image.

This function computes the location of the portion of the MVA closest to the SW for initial control frame near ES so the row placement of the LMVA is between 50 and 80% of the number of rows in the image and the MV is closed. The reason the MV should be closed is because the filter template used to find is feature was created for images where the value had a clearly defined "L" shape. It was found on various images that if the valve were open, then the portion of the MVA closest to the SW would sometimes land on the middle of the MV. The basics of this technique include:

Get image and mask data

Compute portion of the MVA closest to the SW search region

Use expert info to set top, bottom, left, and right for m_crSearchRegion

Set LV chamber search region.

Find the column best representing the LV chamber centerline

Find best septal column

Find the best lateral column

Use the best estimates of the septal and lateral columns to restrict the search for the MV Restrict the right hand side of the search region as the average of the best septal column estimate and the LV chamber estimate Load the convolution template Set the matched filter computation region Compute the matched filter, and Set the portion of the MVA closest to the SW (x, y) location.

In subsequent frames, where it an approximate location is known from the location in the initial frame, the technique becomes:

Get image and mask data

Get (x,y) coordinates of portion of the MVA closest to the SW from other frame

Set the portion of the MVA closest to the SW search region.

Load the convolution template.

Set the Matched filter computation region

Compute the matched filter, and

Set the (x, y) coordinates for the portion of the MVA closest to the SW for the current frame.

The correlation coefficient, septal column mean intensity, septal column width right and left are saved for frames end-diastole and end-systole for analysis and evaluation to decide whether or not the image contains enough information to continue processing.

The Search for the LMVA

The search for the LMVA is more difficult than the MMVA. Not only is the dropout along the LW more frequent and more extensive than the dropout along the SW, but also the MV and the walls of LA provide structures similar in appearance to the LMVA, which confuse the search. The approach used to restrict the search in the initial image frame is to use prior anatomical information such as the diameter of the MV and prior image information such as the minimum and maximum angles between these two features to create a trapezoidal region. Once this initial location has been found, the second step is to again compute in the other image frames in a more restricted rectangle (see FIG. 7) surrounding the LMVA location found in a nearby and already computed frame. If the output value of the matched filter (computed as the correlation coefficient) is above the minimum threshold value set at 0.20, then the new results are saved and the computations continue. Otherwise, the program is aborted.

This function computes the location of the portion of the MV near the LW for a single frame of image data. The region of computation depends on the location of the portion of the MVA closest to the SW but not on the location of the portion of the MV near the LW for other frames. Note that the program is aborted if either no computations are made or if the correlation coefficient returned is below a certain threshold (e.g.,=0.20). This technique generally comprises:

Determine the portion of the MV near the LW trapezoidal search region

Get the image and mask information

Load the convolution template

Set the coordinates of the search region into the matched filter structure

Use the means of the rows to set a threshold for the convolution filter

Compute the convolution filter

Check that the filter was computed for at least one point

If the correlation value is below a minimum value, abort the program, and

Save the location of the portion of the MV near the LW.

The correlation coefficient is saved for the control frame for analysis and evaluation of whether or not to abort. In subsequent frames, the region of computation is a small rectangle surrounding the known portion of the MV near the LW. If no valid computations are made, then the portion of the MV near the LW location from the other frame will be returned. The technique then becomes:

Initialize search to portion of the MV near the LW from the other frame

Determine the portion of the MV near the LW search region

Get the image and mask information

Load the convolution template

Set the coordinates of the search region into the matched filter structure

Use the means of the rows to set a threshold for the convolution filter

Compute the convolution filter, and

If a valid correlation value is computed, save the new result.

The correlation coefficient data is again saved for frames end-diastole and end-systole for analysis and evaluation The Search for the EA The image variability encountered in the search for the EA exceeds that for either the MMVA or the LMVA. Not only does the logic of the algorithm have to deal with chest wall artifact (i.e., bang and other excessive noise) and dropout, but also confusing intra-cavitary structures (i.e., trabeculations). In addition, the images are frequently acquired from a slightly off-angle position so that the wall appears thicker than it actually is. A consequence of these complications is that the development of a single convolution template to capture the shape is extremely difficult—if not impossible. Instead, a search is made for the axis of the LV, the two columns best representing the septal and LWs, and the last row of the chest wall artifact.

In addition, the location of the EA is close to the boundaries of the sector scan where there is no image information at all. Thus, not only do sums along columns, rows, or arcs have to be made within the sector scan, but decisions have to be made on data that is not exactly comparable since two arcs may not contain the same number of pixels. While this problem can be partly averted by averaging, an arc with only a few high intensity pixels near the boundary of the sector scan may be chosen as the correct location when another more prominent location is, in fact, correct with lower but consistent pixel.

The EA location is one of the three key landmarks (together with the left and portion of the MV near the LWs) for pinning down the epicardial border. Another reason its location is important is that the axis through the LV can be defined as the line from the middle of the MV to the apex. This axis can be used in the search for the endocardial border to prevent the estimates for this border along the septal or LWs from encroaching into the other half of the cavity. Thus, a good estimate of the axis would provide a measure of control.

While the EA point is a key to finding the epicardial border, it is the most troublesome of the three to locate. The reasons for this difficulty include:

The presence of chest wall artifact frequently confuses the search;

The location is frequently close to the sector scan lines so filters have to be computed with care;

The contracting of the heart through the imaging plane during systole may result in "movement" of as much as 15 mm both horizontal and vertical during the cycle;

For some images the appearance of the apex region is black (there is no image information);

During image acquisition the sonographer may not have formed the image so that the septal and LWs are close to vertical. In fact, the column location of the apex may not be located between the column locations of the two valve annuli;

This region of the LV has intracavity structures such as trabeculations, which confuse the search;

Since the myocardial tissue is close to being parallel to the beam in this area, frequently more prominent in patients with heart dysfunction, dropout can occur along the lateral and SWs in this region. This situation makes it difficult to track into the apex along a given curve; and The shape of both the epicardial and endocardial borders near the apex can be highly variable. Some researchers have classified these shapes into "footballs," "bullets," and "arrowheads." In any case, the shape is not predictable and can change dramatically in appearance from end-diastole to end-systole.

The technique here generally includes:

Identification of the last row of the chest wall bang;

Search for the epicardial border along the SW;

Search for the epicardial border along the LW;

Estimation of a row for the EA (beyond the region of the bang); and

Estimation of a column for the EA as a weighted average between parabolic arcs formed along the septal and LWs.

Figure 8:
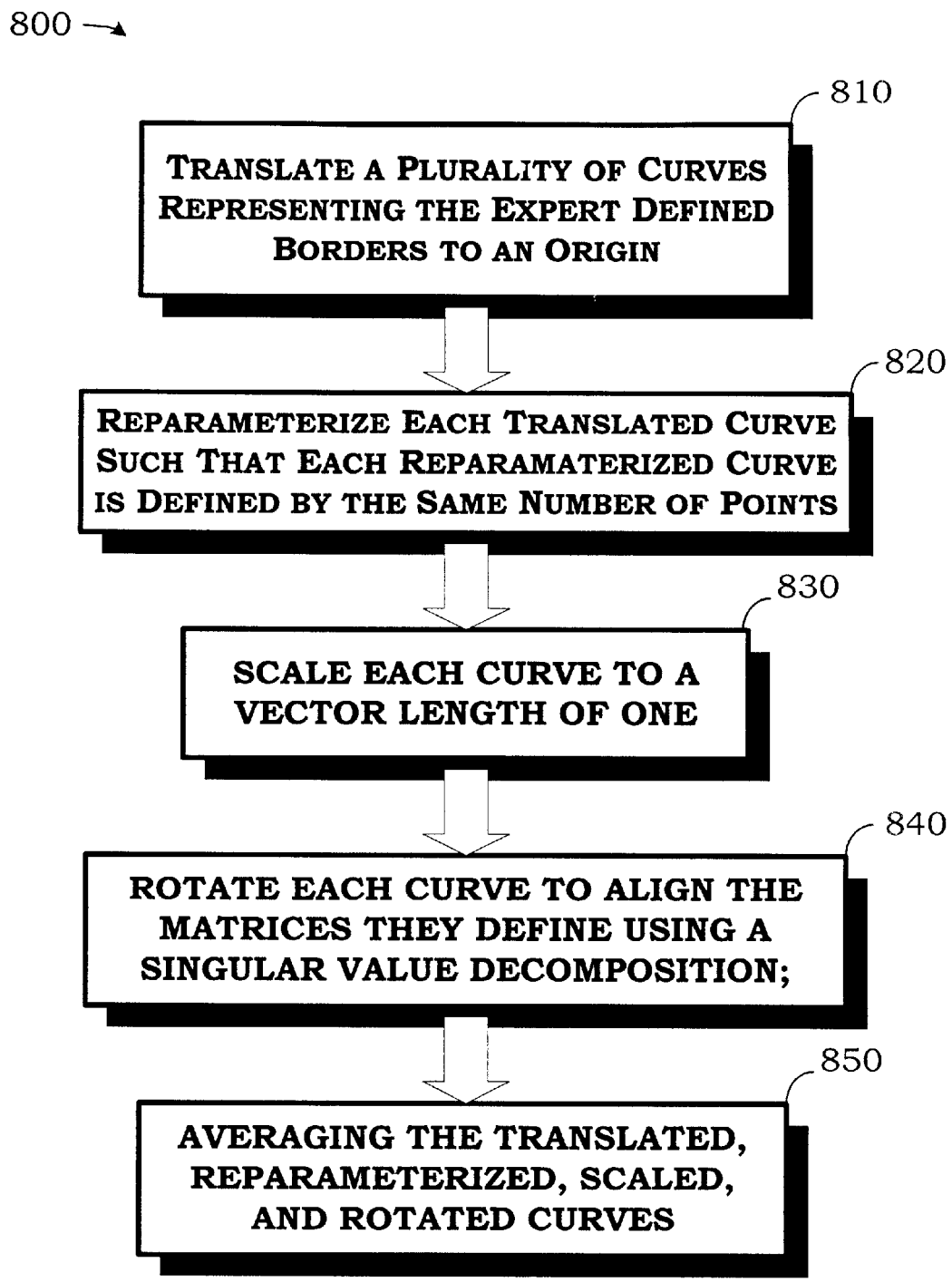
FIG. 8 illustrates one particular implementation of a technique for modeling an epicardial/endocardial border pair from a plurality of such border pairs identified in echocardiographic images of reference hearts.

Modeling a Coupled Epicardial and Endocardial Border Pair from the Identified Coupled Epicardial and Endocardial Borders In this particular embodiment, the method of Procrustes is used to create the model. This particular embodiment computes the average of a collection of expert defined borders traced on a database of images according to the technique 800 set forth in FIG. 8, which proceeds as follows:

First, the center of each curve is translated to a common origin, as set forth in the box 810.

Each curve is then reparameterized so they each contains the same number of reference points (e.g,64), as set forth in the box 820. The curves can now be thought of as vectors in a high (e.g.,128) dimensional vector space.

Each curve is then scaled so that, as a vector, it has length equal to one, as set forth in the box 830. This may be done by dividing by the Frobenius norm (i.e., the square root of the sum of the squares of the entices in the matrix.)

Each curve is rotated using the singular value decomposition so that the matrices are all in best alignment, as set forth in the box 840. FIG. 9 illustrates a set of identified borders 900, such as the borders 300, 305 in FIG. 3A and FIG. 3B, that have been processed in this manner.

Figure 10:
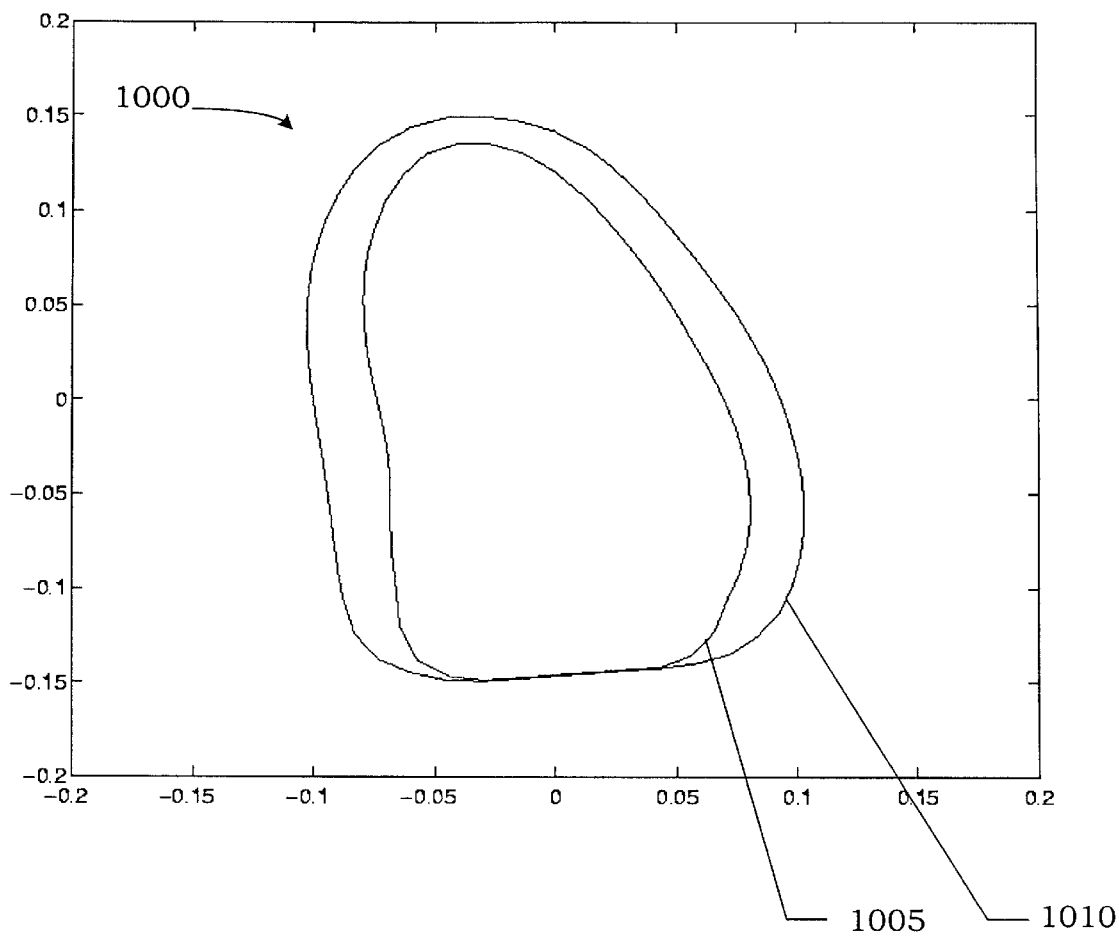
FIG. 10 depicts a pair of endocardial/epicardial borders modeled from the identified border pairs depicted in FIG. 9.

The final step is to form the geometric model as a vector, which is computed as the average of all these translated, reparameterized, scaled and rotated curves, as set forth in the box 850. FIG. 10 illustrates the Procrustean model 1000, comprising the modeled epicardial 1005 and endocardial 1010 borders, achieved by averaging the identified borders in FIG. 8.

The modeled borders are then mapped into the synthetic image.

Figure 11B:
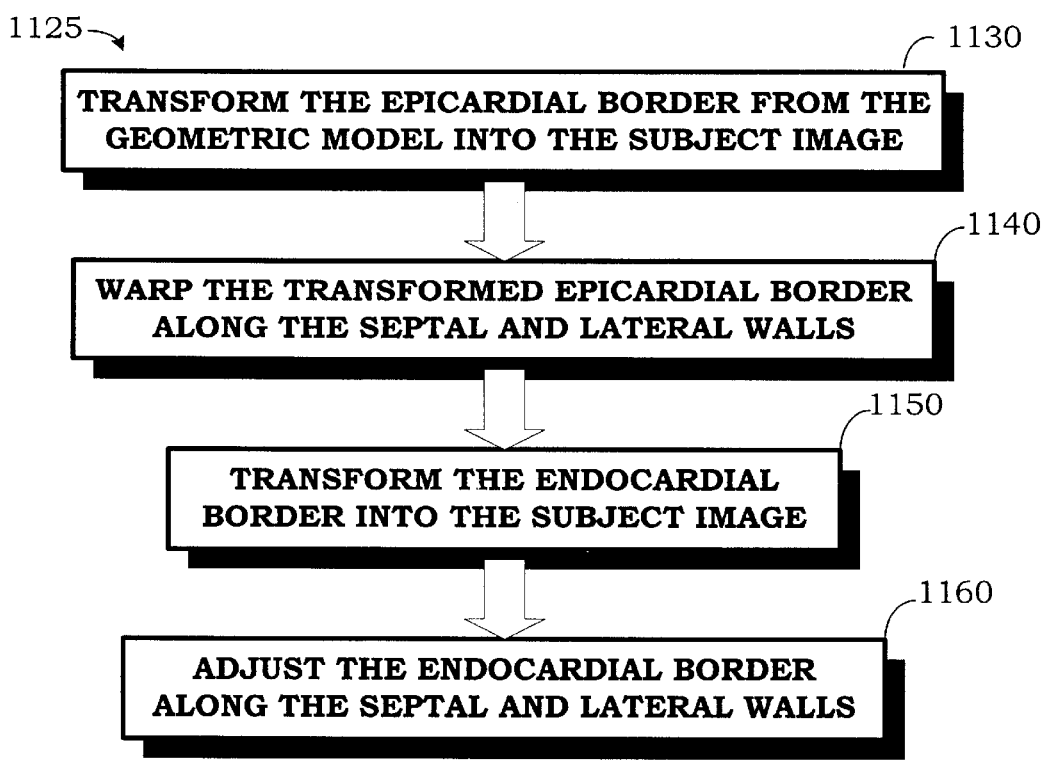
FIG. 11B illustrates one particular implementation of a method for mapping a modeled epicardial/endocardial border pair into a synthetic image.
Figure 15A:
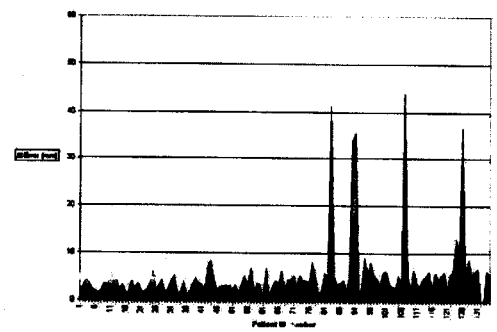
FIG. 15A and FIG. 15B graphically illustrate distances between expert and computer MMVA estimates at ED and ES for 68 patients.
Figure 15B:
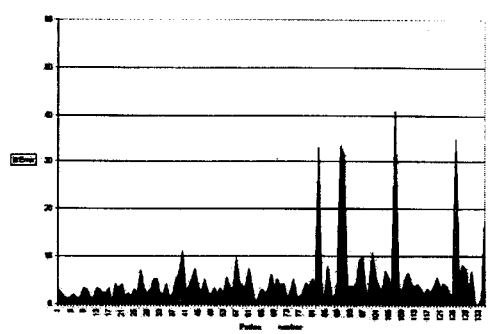

Mapping the Modeled Epicardial and Endocardial Border Pair into the Subject Echocardiographic Image In this particular embodiment, the mapping proceeds in several phases. One particular implementation 1125 is illustrated in FIG. 11B as proceeds as follows:

a linear transformation is performed using a thin-plate spline transformation to transform the epicardial border from the geometric model into the synthetic image, as set forth in the box 1130;

the epicardial borders are then adjusted, or warped, along the septal and LWs, as set forth in the box 1140;

a second thin-plate spline and nine evenly-distributed points along the epicardial border used to transform the endocardial border into the synthetic image, as set forth in the box 1150; and the epicardial border and the axis through the center of the LV chamber are then used as controls to adjust the endocardial border along the septal and LWs, as set forth in the box 1160.

Each operation shall now be discussed in turn.

A First Thin-Plate Spline Transformation to EMBED the Epicardial Border

The mapping begins by using a thin-plate spline transformation technique to map the geometric model of the epicardium into the synthetic image. One result of this mapping is that the positions of the identified features on the model will correspond to the locations of the features in the image. For three points in the plane this technique requires the solution of 6 equations and 6 unknowns, which can be readily solved using Graus elimination.

The thin-plate spline transformation technique is well known and creates a map $T(x,y)=(T\_x(x,y),T\_y(x,y))$ from the plane to the plane. Since the map is two dimensional, the transformation is performed one in each dimension. The stable behavior of the transformation can be measured by the fact that of all the smooth transformations of the plane to the real line which transform a given set of data points $P\_j=(x\_j,y\_j)$ for $j=1, 2, \ldots, k$ to a given set of values (or heights) $h\_i$ for $i=1, 2, \ldots, k$, the thin plate spline is the one which has minimal energy.

In particular, it is the one which minimizes the integral of the square of the Laplacian given by the bending energy BE=integral (over the entire plane) of DEL2, where DEL2= $(d^2T\_x(x,y)/dx^2)^2+2(d^2T\_x(x,y)/dxdy)\ ^2+(d^2T\_x(x,y)/dy^2)^2$ or $(d^2T\_y(x,y)/dx^2)^2+2(d^2T\_y(x,y)/dxdy)\ ^2+(d^2T\_y(x,y)/dy^2)^2$ and the symbol $dT\_x(x,y)/dx$, $dT\_x(x,y)/dy$, $dT\_y(x,y)/dx$, and $dT\_y(xy)/dy$ represent partial derivatives wrt x and y and ^2 represents either the square of a value or the second partial derivative.

The thin-plate spline transformation for a given set of data points $(x\_j,y\_j)$ and heights $h\_i$ for $j=1,2,\ldots,k$ is defined as follows:

Let $U(x,y)=r^2*\log(r)$, where $r=r(x,y)=\sqrt{x^2+y^2}$.

Let $Uij=U(Pi-Pj)=U(x\_i-x\_j, y\_i-y\_j)$.

Let $$K = \begin{vmatrix} 0 & U12 & U13 & \ldots & U1k \\ U21 & 0 & U23 & \ldots & U2k \\ \ldots & & & & \\ \ldots & & & \ldots & \\ \ldots & & & \ldots & \\ Uk-1,1 & Uk-1,2 & & \ldots & Uk-1,k \\ Uk1 & Uk2 & Uk3 & \ldots & 0 \end{vmatrix}$$

and

-continued $$Q = \begin{vmatrix} 1 & x\_1 & y\_1 \\ 1 & x\_2 & y\_2 \\ 1 & x\_3 & y\_3 \\ \ldots \\ \ldots \\ 1 & x\_k & y\_k \end{vmatrix}$$

Let $$L = \begin{vmatrix} K & Q \\ Q\char`\^t & Z \end{vmatrix},$$

where ^t indicates the transpose and Z=a 3×3 matrix of zeros.

The thin-plate spline f(x,y) having heights h__i at points P__i=(x__i,y__i) for i=1 , . . . , k is the function f(x,y)=w__1*U(x—x__1,y—y__)+ w__2*U(x—x__2,y—y__ 2)+ . . . +w__k*U(x—x__k,y—y__k)+a__0+a__x*x+a__y*y, where W=(w__1, w__2, . . . , w__k,a__{0,a}—x,a__y)^t is the solution to the liner equation L*W=Y, where Y=(h__1,h__2, . . . , h__k,0,0,0)^t.

The function f(x,y) has four important properties:
  f(x__i,y__i)=h__i for i=1, 2, . . . , k (The interpolation property)
  Of all the smooth functions that satisfy the interpolation property the function f(x,y) has the smallest bending energy (BE);
  The value of BE=Y^tM^{-1}Y/(8PI), where M^{-1} indicates the upper left k rows and k columns of the inverse of the matrix L; and
  Despite the fact that the matrix K is far from diagonally dominant, the solution W of the matrix equation L*W= Y" almost always exists and the solutions are stable. (if h__1 is different from h__2 and (x__l,y__1)=(x__2,y__2) a problem will occur.)

Note, however, that other embodiments might employ different approaches.

Warping the SW and LW of the Epicardial Contour

The mapping then warps the SW and the LW of the epicardial contour to positions of better accuracy. This module adjusts the epicardial contours along the SW and LW using matched filter techniques. The reason for this module is that while a thin-plate spline transformation of the Procrustes model for the epicardial border into the image aligning the valve annuli and the apex frequently provides a reasonable estimate of the epicardial border, the epicardial border will almost always have to be adjusted to give a fit accurate enough to satisfy the needs of an echocardiographer.

The primary technique is the computation of one-dimensional convolution filters restricted to a reasonable region of computation. While the filter for the SW was formed from image data provided by expert contours, the filter for the LW is a variation on the first derivative operator <−1,1,1,1,1>. The filter for warping the SW is computed midway between the MMVA and the EA location, while the lateral filter is computed in the basal lateral location. More particularly, a digitized curve (e.g., the result of the thin-plate spline transformation) can be warped to another curve that fits the image data more accurately. The idea is that if a digitized curve has been mapped into an image using a limited number of points (e.g., the left, right, and apex points), then it can be warped to better fit the image data in additional points (e.g., the mild-SW or LW location ) by testing points along a line segment orthogonal to the original curve and then testing to see which location produces the "best fit." This technique allows the user to wrap the original contour to a new one keeping most of the curve fixed.

For example, in this particular implementation, the digitized curve is assumed to have 64 points. If the task is to wrap the mild-SW location between the apex and portion of the MVA closest to the SW, then since the apex has index 28, the portion of the MVA closest to the SW has index 53, and the mid-SW has index 40, the index points on the contour between 29 and 52 will be modified by pushing the curve and testing to check if the new curve is better than the previous ones. In general, the technique works best if the start and end points of the warp are far apart, the original warping point is midway between these two points, the new point the curve is to be warped to is approximately perpendicular to the line through start and end points, and the new point is not too far from the original warp point. In this particular implementation, the driver both warps and checks for the best fit.

A general way to visualize this technique is to give the contour a counter clockwise orientation (i.e., travel counterclockwise around the curve) so that each pair of consecutive points produce a tangential vector v=(a,b). The vector v__PERP=(−b,a) is now normal to the curve. Moreover, it points from the outside of the contour to the inside. By assigning a start distance and an end distance (both taken as positive numbers), the curve can be warped from outside to inside. If a filter has been created with weights w=<w__0, w__1, . . . , w__k>, then the warp that best fits the template is considered the location of best fit. For example, the weights w=<−1 0 1> represent a 1st derivative, while the weights w=<1 −2 1> represents a 2nd derivative.

The mapping then uses, in this particular embodiment, nine points evenly spaced along the epicardial border to create a second thin-plate spline transformation that maps the geometric model of the endocardium into the synthetic image to give a first approximation of the endocardium. In this application, a system of 12 equations and 12 unknowns is solved. The thin-plate spline transformation technique is the same as for the thin-plate spline transformation, although applied somewhat differently.

The mapping then produces a more accurate fit for the endocardium by pushing the borders away from their initial SWs and LWs. While the endocardial border along the septum typically has good quality image data, it also has a complicated sigmoid shape that is difficult to mode. Since the 1st and 2nd harmonics of the cosine series can capture this shape, the discrete cosine transform has been chosen to model this border. This task is implemented by computing 10 rays orthogonal to the epicardial border reaching into the chamber, computing thresholds, and estimating new endocardial positions. Since the image information is of poorer quality along the LW but of a less complicated shape, a simpler one-dimensional array is used to push the thickness and an estimate of the axis of through LV chamber provided by the line joining the EA point and the midpoint of the mitral plane. The thresholds used an estimate of the chamber cavity intensity provided by a rectangle along the axis of the LV. Minimum and maximum ranges for wall-thickness (5–15 mm) may also be used to control this search.

Example 2

Developing Images Manifesting a Predetermined Pathology Using An Apical Two-Chamber View A similar system has been developed which approximates the epicardial and endocardial borders for echocardiographic image sequences acquired from the apical two-chamber view. In the apical two-chamber view, the epicardial border and the endocardial border may be comparable in brightness on the endocardial slightly more prominent and the epicardial along the inferior/posterior wall. However, the epicardial border is determined first for control. The reason for interest in the MV plane for making automated measurements is that this anatomical structure usually forms a prominent feature in this type of image and thus provides a good starting point for placement of the epicardial border. If the image has been acquired by the sonographer with proper viewing angle (Weyman, 1984), gain settings, and depth settings, then the portion of the MVA closest to the inferior wall will be in the lower central portion of the image.

Example 3
Developing Images Manifesting a Predetermined Pathology Using a Parasternal, Short-Axis View Major features for the parasternal short axis view are the posterior epicardial-pericardial interface with the lung, and the right ventricular surface of the anterior septum. These interfaces are found with large elliptical arc filters. The model for the LV in the short axis view is an ellipse. For the apical four-chamber view, the major feature is the cavity of the LV followed by the interventricular septum, the MVA, and finally the EA. Once the MVA and EA positions are located, the model used to control the search for specific endocardial and epicardial points is a composite of expert drawn epicardial and endocardial borders from a large database.

From among the standard views to choose from in echocardiography, there are a number of reasons for considering the parasternal short-axis view. The first is that the borders typically have an oval (and thus easily described) shape. A second reason is that the image information for the endocardial border tends to be better than the information provided by the other views.

The present method models the oval appearance of the epicardium as a continuous contour spliced together from 4 elliptical arcs. The approach is a "global-to-local" or "top-down" strategy that uses large convolution filters to identify four juncture points of the contour as features in the image. The first step in this method is to search for the epicardial/pericardial interface along the posterior wall (Wilson et al., 1992; Wilson et al. et al., 1992; and Wilson et al., 1993) with a circular-arc matched filter. Using this location as a reference point, other matched filters are then used to identify the three other juncture points on the epicardial border, which reside along the anterior wall and the two LWs. Once these four key points have been found, a first approximation of the epicardial border is then formed as a continuous contour spliced together from 4 elliptical arcs, where the center of each elliptical arc is the midpoint between the anterior and posterior estimates. While the search for the endocardial border uses traditional edge-detection methods, the epicardial border, together with several estimates of wall thickness, are used to control the search.

Efficacy of the Invention
Developing Synthetic Images Manifesting a Predetermined Pathology Using an Apical Four-Chamber View The distances (in mm) representing the differences between the expert and computer-based estimates of the three predetermine features are graphed in FIGS. 15A–17B. The graphs in FIGS. 15A, 15B indicate that despite a hand fill of unacceptable estimates, the method used to locate the MMVA provides reasonably accurate estimates. The data in Table 1 below indicates that the differences for the MMVA search are about the same in both the x (i.e., column) and y (i.e., row) directions and at end-diastole and end-systole.

Figure 16A:
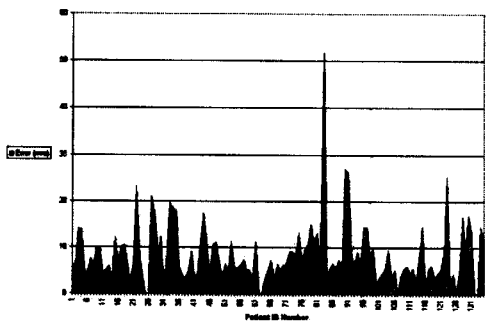
FIG. 16A and FIG. 16B graphically illustrate the distances between expert and computer LMVA estimates at ED and ES for 68 patients.
Figure 16B:
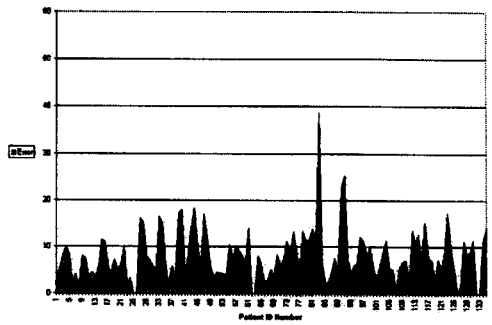
Figure 17A:
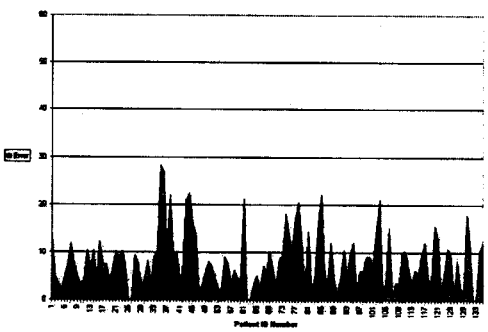
FIG. 17A and FIG. 17B graphically illustrate the distances between expert and computer epicardial apex (EA) estimates at ED and ES for 68 patients.
Figure 17B:
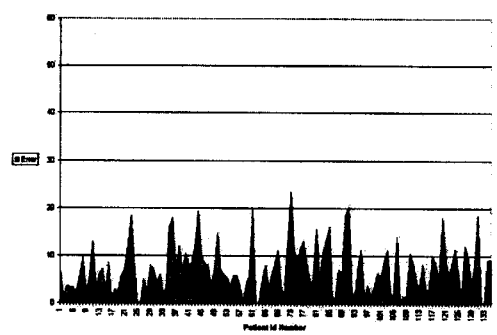

The distances between expert and computer-based methods for locating the LMVA, the MMVA and the EA are graphed in FIG. 16A, FIG. 16B and in FIG. 17A and FIG. 17B, respectively. A cursory inspection of the data indicates that the differences for the lateral MMVA are worse than the differences for the MMVA and the differences for the EA are worse than the LMVA.

The data in Table 1 indicate that while the y differences are comparable for the 3 searches, the x differences for the LMVA and EA are approximately double for those of the MMVA. (Since the method is designed to terminate all computations whenever the correlation coefficient for either the MMVA or LMVA is less than 0.20, three of the differences graphed in FIG. 15A, FIG. 15B, FIG. 12A and FIG. 12B of the differences in FIG. 16A and FIG. 16B appear as zero even though no borders were found.) While it is clear that dropout of image information along the LW was one factor adversely affecting the search for the LMVA, a second factor is the choice of convolution template itself.

The data in FIG. 17A, FIG. 17B and Table 1 clearly reflects the complexities in designing a method to locate the EA. These complexities include:

chest wall artifact on the exterior of the LV;

while most apex locations are represented by high intensity pixels, sometimes the expert placed the apex in a black (i.e., low-intensity) region;

trabeculations on the inside of the LV cavity;

the proximity of the EA to the sector scan lines;

the fact that the EA may move as much as 10 mm through the image from ED to ES;

the fact that the image characteristics near the apex may change substantially from ED to ES; and the sonographer may have acquired the image from a somewhat off-angle view so the myocardium at the EA appears thicker than it should.

TABLE 1

| MEAN DIFFERENCES (MM) BETWEEN EXPERT AND COMPUTER X AND Y ESTIMATES |||||||||||||
| --- | --- | --- | --- | --- | --- | --- | --- | --- | --- | --- | --- |
| MMVA |||| LMVA |||| EA ||||
| BD || ES || ED || ES || ED || ES ||
| X | Y | X | Y | X | Y | X | Y | X | Y | X | Y |
| 3.08 | 3.57 | 3.10 | 2.86 | 6.64 | 3.74 | 7.13 | 2.92 | 7.84 | 2.13 | 6.20 | 2.65 |

A summary of the differences between the expert and computer estimates for the LV chamber area is presented in Table 2. Note that while the correlation coefficients for the area estimates are reasonable, the value of 0.53 for the FAC indicates numerous problematic images present in the database.

TABLE 2

COMPARISONS OF EXPERT AND COMPUTER AREA AND FAC ESTIMATES

|  | CHAMBER AREA AT ED | CHAMBER AREA AT ES | FAC |
|---|---|---|---|
| Mean Differences | 3.43 ± 2.76 (cm$^2$) | 3.09 ± 2.22 (cm$^2$) | 8.96 ± 8.37% |
| Correlation Coefficient | 0.86 | 0.87 | 0.53 |

Results show substantial agreement between the expert and computer-based method for a prospective database of images acquired from 68 patients with 2 cycles/patient for all but 1 patient (or n=—5). The correlation coefficients for the areas were 0.86 and 0.87, respectively. The correlation coefficient for the FAC is 0.53. The mean of the differences between the expert and computer estimates of the areas were 3.43 cm$^2$ and 3.09 cm$^2$, respectively. The mean of the absolute value of the differences between FAC estimates was 8.96%.

Developing Images Manifesting a Predetermined Pathology using a Parasternal Short-Axis View In a series of 202 short axis images, the correlation between the areas enclosed by expert drawn borders and those enclosed by the ABD borders were >0.93 for all segments. Area correlation between an expert drawn border and one detected by the algorithm does not guarantee that the shape and absolute position of the border at each point is correct. For this reason, the borders were also judged using absolute point-by-point comparisons and by intersection/union ratios (IUR) calculated between multiple expert borders and the borders detected by the algorithm in the same image. The mean absolute differences between the absolute ABD border positions and the consensus border of three experts in a series of 55 good quality patient studies were within the range of differences between the individual observers. This suggests that the algorithm functioned at the level of an independent expert in these studies (Geiser et al., 1998). In the series of 202 studies, 75% of all ABD borders had a calculated IUR greater than 0.81.

REFERENCES

The following literature citations as well as those mentioned above are cited for the reasons cited in the above text:

U.S. Pat. No. 5,360,006.

American Society of Echocardiography Committee on Standards, Subcommittee on Quantitation of Two-Dimensional Echocardiograms, *Journal of the American Society of Echocardiography,* September–October, 1989.

"Recommendations for Quantitation of the Left Ventricle by Two-Dimensional Echocardiography, *Journal of the American Society of Echocardiography,* September–October, 1989.

Baldock, R. A. "Trainable models for the interpretation of echocardiogram images," in *Information Processing in Medical Imaging* (A. C. F. Colchester and D. J.Hawkes, eds.), vol. 511 of *Lecture Notes in Computer Science,* pp. 408–418, 1991.

Ballard, D. and Brown, C., Computer Vision. Englewood Cliffs, N. J.: Prentice-Hall, 1982.

Becher, H., Tiemann, K., Powers, J., "Power Harmonic Imaging—Clinical Application in Contrast Echocardiography", *medicomundi,* 43(2):26–30, 1999.

Bookstein, F. L., "Morphometric Tools for Landmark Data," Cambridge University Press, 1991.

Bookstein, F. L., "Quadratic variation of deformations," in Information Processing in Medical Imaging (J. Duncan and G. Gindi, eds.), pp. 15–28, 1997.

Chalana, V., Linker, D., Haynor, D. R., and Kim, Y. "A multiple active contour model for cardiac boundary detection on echocardiographic sequences," *IEEE Trans Medical Imaging,* vol. 15, pp. 290–298, 1996.

Criton, A. L., Loupas, T., Routh, H. F., Pesque, P. R., "Automated Quantification in Tissue Doppler Imaging", *Computers in Cardiology,* 25:93–95, 1998.

Dolimier, D., Skyba, D., Powers, J., Souquet, J., Loupas, T., Pesque, P., "HDI Lab: Research Software for Contrast Echocardiographic Image Analysis", *J Ultrasound Med.,* 18(S):154, 1998.

Entrekin, R., Jackson, P., Jago, J. R., Porter, B. A., "Real Time Spatial Compound Imaging in Breast Ultrasound: Technology and Early Clinical Experience", *medicomundi,* 43(3):35–43, 1999.

Geiser, E. A., Oliver, L. H., Gardin, J. M., Kerber, R. E., Parisi, A., Reichek, N. Werner, J. A. and Weyman, A. E., "Clinical validation of an edge detection algorithm for two-dimensional echocardiographic short-axis images," *J American Society Echocardiography,* vol. 1, pp. 410–421, 1988.

Geiser, E. A. Conetta, D., Limacher, M., Stockton, V. Oliver, L, and Jones, B., "A second-generation computer-based edge detection algorithm for short-axis, two-dimensional echocardiographic images: Accuracy and improvement in inter-observer variability," *J Am Society Echo,* Vol. 3:79–90, 1990.

Geiser, E. A. "Edge detection and wall motion analysis," *Echocardiography: An International Review* (J. Chambers and M. Monaghan, eds.), pp. 71–82, Oxford: Oxford University Press, 1993.

Geiser, In: *Echocardiography in Coronary Artery Disease,* Kerber, Richard E., [Ed.], entitled *Applications of Automatic Edge Detection and Image Enhancement Techniques to Two-Dimensional Echocardiography and Coronary Disease,* (Futura Publishing Company, Mount Kisco, N. Y., 1998.

Geiser, E. A., Wilson, D. C., Wang, D. X., Conetta, D. A., Murphy, J. D., Hutson, A. D., "Autonomous Epicardial and Endocardial Boundary Detection in Echocardiographic short-axis Images",*J. Am. Soc. Echo.,* 11:338–48, 1998.

Kendall, D. G., "Shape-manifolds, Procrustean metrics, and complex projective spaces," Bull *London Math* Society, vol. 16, pp. 81–121, 1984.

Kerber, Richard E., Ed., In *Echocardiography in Coronary Artery Disease,* entitled *Applications of Automatic Edge Detection and Image Enhancement Techniques to Two-Dimensional Echocardiography and Coronary Disease,* by E. A. Geiser (Futura Publishing Company, Mount Kisco, N.Y., 1988.

Kotcheff, A. C. W. and Taylor, C. J., "Automatic construction of eigenshape models by genetic algorithm," in *Information Processing in Medical Imaging* (J. Duncan and G. Gindi, eds.), pp. 1–14, 1997.

Lees, W., "3- and 4-Dimensional Ultrasound Imaging", *medicomundi,* 43(3):23–30, 1999.

Leen, E., "Ultrasound Contrasts in Clinical Applications", *medicomunde,* 43(3):17–22, 1999.

Meyerowitz, C. B., Fleischer, A. C., Pickens, D. et al., "Quantification of Tumor Vascularity and Flow with Amplitude Color Doppler Sonography in and Experimental Model: Preliminary Results", *K. Ultrasound Med.*, 15(12):827–33, 1996.

Rickey, D. W., Fenster, A., "Evaluation of an Automated REal-time Spectral Analysis Technique", *Ultrasound Med. Biol.*, 22(1):61–73, 1996.

Rosenfeld, A. and Kak, A. "Digital Picture Processing, Computer Science and Applied Mathematics," New York: Academic, $2^{nd}$ ed., 1982.

Skorton, D. J. and Collins, S. M. "Digital computer image analysis in echocardiography," *Echocardiography*, Vol. 1, pp. 15–43, 1984.

Tardif, J. C., Panadian, N. G., Freire, M., Cao, Q. L., Pollard, H., On-line Echocardiographic Assessment of Hemodynamic Indexes by an Adoptive Doppler Analysis Algorithm and Signal/Noise Ratio Calculation", *J. Am., Soc. Echocardiogr.*, 9(1):9–17, 1996.

Weyman, A. E., Franklin, T. D., Hogan R. D. et al., "Importance of Temporal Heterogeneity in Assessing the Contraction Abnormalities associated with Acute Myocardial Ishemia", *Circulation*, 70:102–12, 1984.

Wilson, D. C. and Geiser, E. A., "Automatic center point determination in 2-dimensional short-axis echocardiographic images," *Pattern Recognition*, Vol. 25:893–900, 1992.

Wilson, D. C. Geiser, E. A. and Li, J-H., "Use of matched filters for extraction of left ventricular features in 2-dimensional short-axis echocardiographic images," in the *Proceedings of the International Society of Optical Engineering, Math Methods Medical Imaging*, vol. 1768, (San Diego, Calif.), pp. 37–49, 1992.

Wilson, D. C., Geiser, E. A. and Li, J-H., "Feature extraction in two-dimensional short-axis echocardiographic images," *J Math Imaging and Vision*, vol. 3, pp. 285–298, 1993.

Wilson, D. C., Geiser, E. A., Conetta, D., Murphy, J. and Wang, D., "An automated algorithm for analysis of 2-D echocardiographic short-axis images: A brief overview," *Proceedings, IEEE Workshop on Mathematical Methods in Biomedical Image Analysis, San Francisco, Calif.*, pp. 222–231, 1996.

Zhang, L. and Geiser, E. A. *An Effective Algorithm for Extracting Serial Endocardial Borders From 2-D Echocardiograms*, IEEE, Transactions Biomed. Eng., Vol. BMIE-3 1, pp. 441–447, 1984.

Conclusion

The present invention provides a system for rapidly and automatically providing highly accurate four-chamber and two-chamber apical heart images. Particular advantages are the quality of the images and the lack of direct involvement by the observer, thereby significantly decreasing variability. These methods decrease the time required to make detailed measurements of heart function, and reduce the inter- and intra-observer variability of the measurements. This is particularly advantageous when comparing data between patients or when assessing the progression of a patient's disease over an extended time period. This allows improved confidence in decisions regarding therapy.

More particularly, the present invention employs matched filter banks and a top-down, knowledge-guided approach to identify the epicardial and endocardial borders for the cardiac cycle. The technique is based on the steps an expert may take in deciding the position of the left ventricle in a very poor quality study. This works from the features of gross shape and structure associations toward the more subtle features of point-by-point border position for the epicardium and endocardium. Prominent features of the image are located using large adaptive filters while the final steps of border location are small, local pixel operations.

The described system is autonomous, and therefore independent, computer expert system that estimates the performance (i.e., health) of the main pumping chamber of the heart. This analysis is performed in a short period of time, and the large inter-observer variability between physicians and between sonographers is minimized. The inter-observer variability is dependent on the degree of training and expertise of the physician or sonographer making these measurements. Use of the system results in a more rapid and more accurate clinical assessment for comparing patients, comparing treatment strategies, and following the progression of a disease of a patient over time.

While the method is fully automated, it provides only a first approximation to an expert's tracing and thus suitable only in a setting where the user can easily adjust the borders. For a patient with unusual pathology (e.g., a pericardial effusion or apical aneurysm), the user will usually be forced to make manual adjustments. For example, while the method performed well on a patient with a dilated cardiomyopathy, it performed poorly for the patients in the image database with a RV volume or pressure overload or MV replacement. When these types of problems are encountered, the user will need the capability to make corrections manually.

Thus, the present invention can provide improved speed and greater convenience for computing indices of cardiac health that measure the degree and progression of a patient's disease. These methods should relieve the clinical practitioner from some of the tedium of making the measurements manually. While the disclosed systems of this invention have been described in terms of preferred embodiments, it will be apparent to those of skill in the art that variations may be applied to the disclosed system and in the steps or in the sequence of steps described herein without departing from the concept, spirit and scope of the invention. More specifically, it will be apparent that algorithms may be modified and reiterative steps applied to obtain the same or similar results would be achieved. For instance, the subject image into which the modeled border pair has been mapped may be manually adjusted and then used as a reference image in subsequent autonomous border detection performed in accordance with the present invention. All such similar modifications apparent to those skilled in the art are deemed to be within the spirit, scope and concept of the invention as defined by the appended claims. Accordingly, the exclusive rights sought to be patented are as described in the claims below.

What is claimed is:

1. A method for autonomously detecting boundaries in a subject echocardiographic image, the method comprising:

(a) obtaining, for a plurality of pathologically similar reference hearts, a reference echocardiographic image of each reference heart at end-systole and at end-diastole;

(b) identifying the epicardial and endocardial borders in each reference echocardiographic image;

(c) locating a plurality of predetermined features in each reference echocardiographic images;

(d) modeling an epicardial/endocardial border pair from the identified epicardial and endocardial borders;

(e) locating the predetermined features in the subject echocardiographic image from the location of the predetermined features in the reference echocardiographic images; and (f) mapping the modeled epicardial/endocardial border pair onto the subject echocardiographic image relative to the location of the predetermined features in the subject echocardiographic image.

2. The method of claim 1, wherein obtaining the echocardiographic image of each reference heart includes obtaining an echocardiographic image of each reference heart in an apical four chamber view, an apical two-chamber view, or a parasternal short-axis view.

3. The method of claim 1, wherein obtaining the echocardiographic image of each reference heart includes obtaining an echocardiographic image for a plurality of pathologically similar reference hearts manifesting at least one of normalcy, pericardial effusion, apical aneurysm, or dilated cardiomyopathy.

4. The method of claim 1, wherein obtaining the echocardiographic image of each reference heart includes:

(a) obtaining a video comprising a sequence of digitized echocardiographic images;

(b) displaying the sequence of digitized echocardiographic images;

(c) selecting two images from the displayed sequence; and (d) capturing the selected images.

5. The method of claim 1, wherein identifying the epicardial and endocardial borders in each reference echocardiographic image includes manually tracing the borders on the echocardiographic images.

6. The method of claim 5, further comprising manually adjusting the autonomously detected borders.

7. The method of claim 1, wherein identifying the coupled epicardial and endocardial borders in each reference echocardiographic image includes invoking an autonomous border detection capability.

8. The method of claim 1, wherein modeling the coupled epicardial and endocardial border pair includes comprises a Procrustean method.

9. The method of claim 8, wherein the Procrustean method comprises averaging a collection of identified borders traced on a plurality of echocardiographic images of reference hearts.

10. The method of claim 9, wherein averaging the collection of expert defined borders includes:

(a) translating a plurality of curves representing the expert defined borders to an origin;

(b) reparameterizing each translated curve such that each reparamaterized curve is defined by the same number of points;

(c) scale each curve to a vector length of one;

(d) rotate each curve to align the matrices they define using a singular value decomposition; and (e) averaging the translated, reparameterized, scaled, and rotated curves.

11. The method of claim 10, wherein mapping the modeled epicardial and endocardial border pair includes:

(a) performing a first thin-plate spline transformation to embed the modeled epicardial border in the subject image relative to the located predetermined features in the subject image;

(b) warping the septal and lateral walls of the embedded epicardial border;

(c) performing a second thin-plate spline transformation to embed the modeled endocardial border in the subject image relative to the embedded epicardial border; and (d) warping the septal and lateral walls of the embedded endocardial border.

12. The method of claim 1, wherein identifying the predetermined features in the echocardiographic images includes manually identifying the predetermined features.

13. The method of claim 1, wherein identifying the predetermined features in the echocardiographic images includes identifying at least one of the medial mitral annulus position, the lateral mitral annulus position, and the epicardial apex of the left ventricle.

14. The method of claim 1, wherein identifying the predetermined features in the echocardiographic images includes identifying the features in a stepwise, autonomous, hierarchical manner.

15. The method of claim 1, wherein locating the predetermined features in the synthetic image from the identified predetermined features includes:

(a) generating a synthetic echocardiographic image at end-systole and at end-diastole from the reference echocardiographic images at end-systole and the reference echocardiographic images at end-diastole, respectively;

(b) creating a convolution filter for each of the predetermined features from the synthetic image; and (c) applying the convolution filters in a hierarchical manner to locate the predetermined features in serial.

16. The method of claim 15, generating the synthetic echocardiographic images includes:

(a) translating a plurality of curves representing the expert defined borders to an origin;

(b) reparameterizing each translated curve such that each reparamaterized curve is defined by the same number of points;

(c) scale each curve to a vector length of one;

(d) rotate each curve to align the matrices they define using a singular value decomposition; and (e) averaging the translated, reparameterized, scaled, and rotated curves.

17. The method of claim 1, wherein identifying the coupled epicardial and endocardial borders of each reference heart in each echocardiographic image and identifying the predetermined features in the echocardiographic images includes identifying the borders and the predetermined features in the same copies of the echocardiographic images.

18. The method of claim 1, wherein identifying the coupled epicardial and endocardial borders of each reference heart in each echocardiographic image and identifying the predetermined features in the echocardiographic images includes identifying the borders and the predetermined features in different copies of the echocardiographic images.

19. The method of claim 1, further comprising manually adjusting the mapped epicardial/endocardial border pair on the subject image.

20. The method of claim 1, further comprising utilizing the subject image in the autonomous detection of boundaries in a subsequent subject image.

* * * * *